(12) United States Patent
Tanaka et al.

(10) Patent No.: US 8,391,491 B2
(45) Date of Patent: Mar. 5, 2013

(54) COMMUNICATION SYSTEM AND SYNCHRONIZATION CONTROL METHOD

(75) Inventors: Akihiro Tanaka, Tokyo (JP); Akio Tajima, Tokyo (JP); Seigo Takahashi, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1426 days.

(21) Appl. No.: 11/482,016

(22) Filed: Jul. 7, 2006

(65) Prior Publication Data
US 2007/0058810 A1 Mar. 15, 2007

(30) Foreign Application Priority Data
Jul. 8, 2005 (JP) ................................. 2005-200974

(51) Int. Cl.
*H04L 29/06* (2006.01)
(52) U.S. Cl. ......... 380/274; 380/278; 713/400; 713/501
(58) Field of Classification Search .................. 380/274, 380/278; 713/400, 501
See application file for complete search history.

(56) References Cited

U.S. PATENT DOCUMENTS

| | | | | |
|---|---|---|---|---|
| 4,764,980 A * | 8/1988 | Sakaguchi et al. | ............ | 398/154 |
| 5,675,648 A * | 10/1997 | Townsend | ...................... | 380/278 |
| 5,757,912 A * | 5/1998 | Blow | ............................ | 380/256 |
| 5,768,378 A * | 6/1998 | Townsend et al. | ............ | 380/256 |
| 5,850,441 A * | 12/1998 | Townsend et al. | ............ | 380/283 |
| 6,137,734 A * | 10/2000 | Schoner et al. | ................ | 365/194 |
| 6,177,922 B1 * | 1/2001 | Schiefer et al. | ................ | 345/698 |
| 6,956,868 B2 * | 10/2005 | Qiao | ............................. | 370/466 |
| 6,961,930 B1 * | 11/2005 | Waldspurger et al. | ........ | 717/141 |
| 7,006,635 B2 * | 2/2006 | Parks et al. | ..................... | 380/263 |
| 7,092,410 B2 * | 8/2006 | Bordonaro et al. | ........... | 370/516 |
| 7,437,764 B1 * | 10/2008 | Sobel et al. | ..................... | 726/25 |
| 7,515,714 B2 * | 4/2009 | Orihashi et al. | .............. | 380/255 |
| 7,627,126 B1 * | 12/2009 | Pikalo et al. | ................... | 380/279 |

(Continued)

FOREIGN PATENT DOCUMENTS

| | | |
|---|---|---|
| JP | 2000-174747 A | 6/2000 |
| JP | 2004-112278 A | 4/2004 |

(Continued)

OTHER PUBLICATIONS

Bennett and Brassard, "Quantum Cryptography: Public Key Distribution and Coin Tossing," IEEE International Conference on Computers, Systems and Signal Processing, Bangalore, India, pp. 175-179.

(Continued)

*Primary Examiner* — Edan Orgad
*Assistant Examiner* — James Turchen
(74) *Attorney, Agent, or Firm* — Sughrue Mion, PLLC

(57) ABSTRACT

A sender transmits to a receiver an optical signal that is phase-modulated in accordance with source data and a basis stored in a memory. The receiver phase-modulates the received optical signal in accordance with a basis, obtains detection data through interference, and stores the detection data in a memory. An inter-device address difference ($G_D$) and an intra-device address difference ($D_I$) are provisionally set. The detection data are checked against the source data while sequentially changing the values of $G_D$ and $D_I$ within a predetermined adjustment range. Based on the result of this checking, $G_D$ and $D_I$ are determined.

13 Claims, 13 Drawing Sheets

U.S. PATENT DOCUMENTS

| | | | |
|---|---|---|---|
| 2002/0041687 A1* | 4/2002 | Parks et al. | 380/263 |
| 2002/0174440 A1* | 11/2002 | Usuba et al. | 725/110 |
| 2005/0078827 A1* | 4/2005 | Tajima | 380/256 |
| 2005/0135167 A1* | 6/2005 | Manabe | 365/201 |
| 2008/0201526 A1* | 8/2008 | Yabe | 711/114 |

FOREIGN PATENT DOCUMENTS

| | | |
|---|---|---|
| WO | WO 03/009513 A2 | 1/2003 |

OTHER PUBLICATIONS

N. Lutkenhaus, "Estimates for practical quantum cryptography," Physical Review A, vol. 59, No. 5, p. 3301.

M. Williamson, "Eavesdropping on practical quantum cryptography," quantum-ph/0211155.

G. Ribordy, "Automated 'plug & play' quantum key distribution," Electronics Letters, vol. 34, No. 22, pp. 2116 to 2117.

W. Maeda, "High-Speed QKD System Synchronized by Automatic Phase-Alignment Mechanism," OFC2005, OW14.

Tomita, "Balanced, gated-mode photon detector for quantum-bit discrimination at 1550nm," Optics letters, vol. 27 (2002), pp. 1827 to 1829.

A. Tanaka, "Temperature independent QKD system using alternative-shifted phase modulation method," ECOC2004, Tu4.5.3.

* cited by examiner

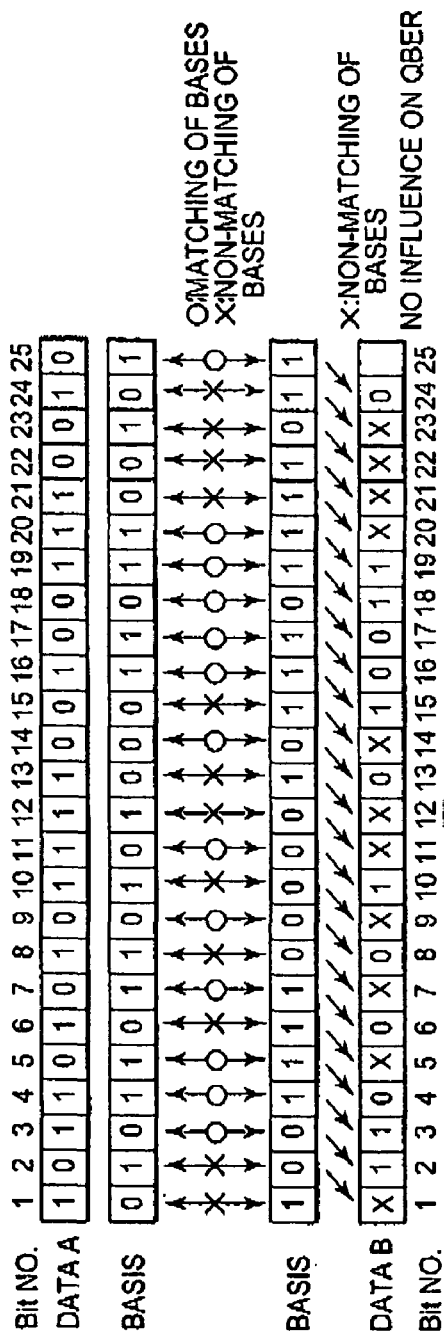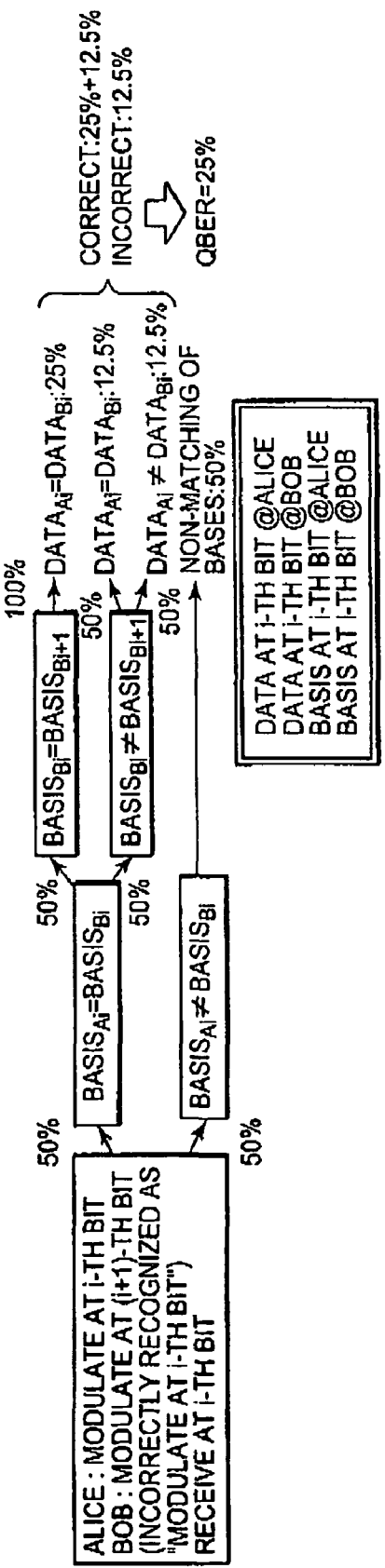

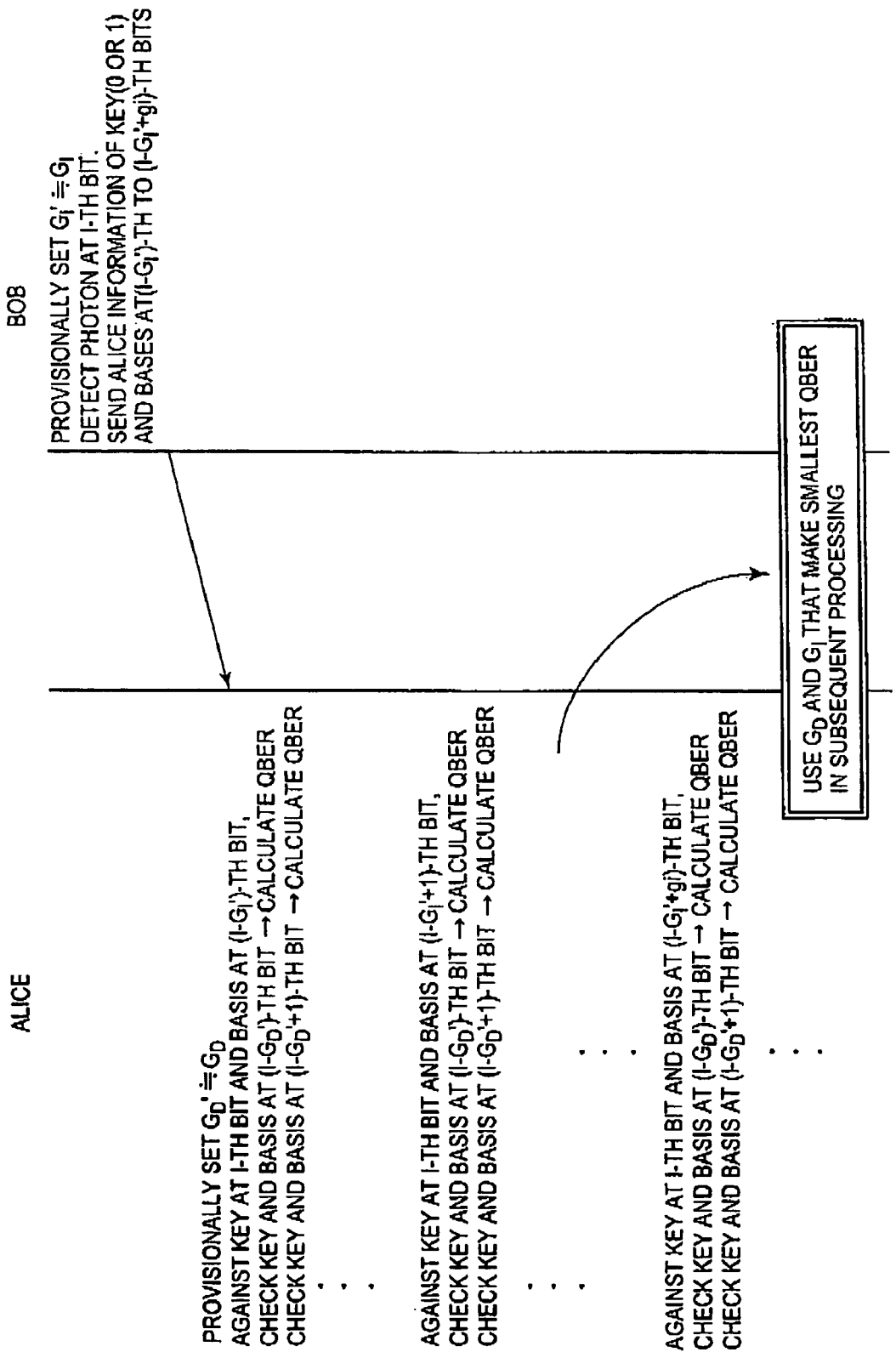

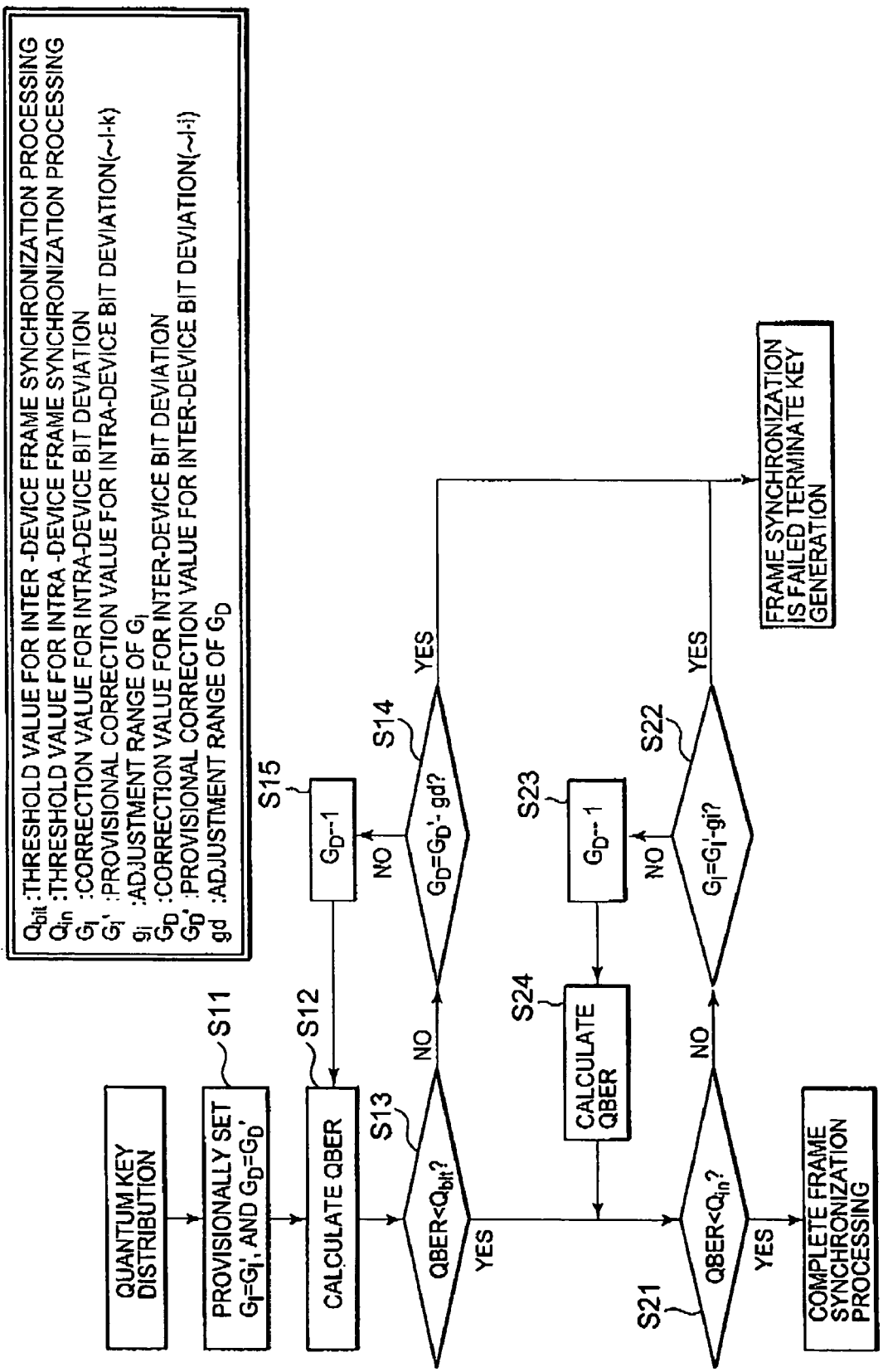

COMMUNICATION SYSTEM AND SYNCHRONIZATION CONTROL METHOD

BACKGROUND OF THE INVENTION

1. Field of the Invention

The present invention relates to a communications system in which data is transmitted from a sender to a receiver through a transmission line. In particular, the present invention relates to a synchronization control method and a system for establishing a bit-to-bit correspondence of data between a sender and a receiver.

2. Description of the Related Art

The internet, which continues growing rapidly, is convenient on one hand, but its security is quite uncertain on the other hand. There is an increasing need for cryptographic technologies in order to maintain the secrecy of communications. Cryptographic schemes currently used in general can be classified into two categories: secret key cryptography such as DES (Data Encryption Standard) and triple DES, and public key cryptography such as RSA (Rivest Shamir Adleman) and ECC (Elliptic Curve Cryptography). However, these techniques are cryptographic communication methods that ensure the security of communication based on the "complexity of computation" and are always fraught with the danger that ciphertext could be broken with the advent of an algorithm enabling a vast amount of computation or a cryptanalysis algorithm. With such a background, quantum key distribution (QKD) systems receive attention as the cryptographic key distribution technologies that are "absolutely immune against eavesdropping."

In QKD, a photon is generally used as a communication medium, and transmission is performed by superimposing information on the quantum state (such as polarization and phase) of the photon. An eavesdropper present on a transmission line intercepts the information by tapping photons being transmitted, or by other methods. However, according to the Heisenberg's uncertainty principle, it is impossible to perfectly return the quantum state of a photon once observed to its original state before observation, and resultantly, a change occurs in the statistic values of received data detected by a legitimate receiver. By monitoring this change, the receiver can detect the presence or absence of an eavesdropper on the transmission line.

In the case of a quantum key distribution method utilizing the phase of a photon, a transmitter/sender and a receiver (hereinafter, referred to as "Alice" and "Bob" respectively, as have been used traditionally) constitute an optical interferometer. Alice and Bob individually perform random phase modulation on each of single photons. Output of 0 or 1 is obtained depending on the difference between the depths of these phase modulations. Thereafter, Alice and Bob check part of the respective conditions they used when the output data were measured against each other, whereby the same bit string can be shared between Alice and Bob finally. Next, the most typical quantum key distribution algorithm by the name of BB84 protocol will be described briefly (see Bennett and Brassard, "Quantum Cryptography: Public Key Distribution and Coin Tossing," IEEE International Conference on Computers, Systems and Signal Processing, Bangalore, India, pp. 175-179).

FIG. 1 is a schematic diagram showing a concept of a quantum key distribution method according to the BB84 protocol. Here, it is assumed that Alice 141 and Bob 143 are connected through an optical transmission line 142.

According to this method, Alice 141 has two random number sources, one of which (random number 1) provides random numbers representing cryptographic key data (0/1), and the other one of which (random number 2) is for determining the way of coding the information of the random number 1. In quantum key distribution methods utilizing the phase of a photon, two coding sets are used: a coding set for representing a set of phases of 0 and $\pi$ that correspond to "0" and "1" in the cryptographic key, respectively (hereinafter, this set will be referred to as "+basis"), and a coding set for representing a set of phases of $\pi/2$ and $3\pi/2$ that correspond to "0" and "1" in the cryptographic key, respectively (hereinafter, this set will be referred to as "x basis". The random number 2 is used to make a selection from the two bases. That is, any one of the four types of modulation $(0, \pi/2, \pi, 3\pi/2)$ is randomly performed on each of single photons, which are then sent to Bob one by one.

On the other hand, Bob 143 has a random number source (random number 3) corresponding to the bases and uses it to decode the single photons sent from Alice 141. When a value of the random number 3 is "0", a modulation of 0 phase (+basis) is performed on a photon. When a value of the random number 3 is "1", a modulation of $\pi/2$ phase (x basis) is performed on a photon. Here, random numbers obtained as the output of the optical interferometer are collectively referred to as random number 4.

When a basis Alice used in modulation is the same as a basis Bob used in modulation (random number 2=random number 3), Bob can correctly detect a value of the random number 1 (random number 1=random number 4). When a basis Alice used in modulation is different from a basis Bob used in modulation (random number 2≠random number 3), Bob randomly obtains a value of 0 or 1 for the random number 4, independently of a value of the random number 1. Since each of the random numbers 1, 2 and 3 is a collection of random numbers varying with each one bit, the probability that a basis match occurs and the probability that no basis match occurs are both 50%. However, since those bits corresponding to the non-matching bases are removed through basis reconciliation at a subsequent stage, Alice 141 and Bob 143 can share a bit string composed of 0s and 1s based on the random number 1.

However, the bit string thus shared contains errors attributable to the transmission line 142 and/or the receiver, and therefore, to correct these errors, error correction processing is needed. In addition to this, errors also occur in the shared bit string when an eavesdropper present on the transmission line intercepts the photon information. Accordingly, to share a cryptographic key for final use, not only the error correction processing for correcting errors, privacy amplification is also needed to reduce the amount of information that conceivably has been intercepted, based on the frequency of errors (error rate). Incidentally, methods of estimating "the amount of information that conceivably has been intercepted" are described in the following documents:

N. Lutkenhaus, "Estimates for practical quantum cryptography," Physical Review A, Vol. 59, No. 5, p. 3301 (hereinafter, this document will be referred to as Lutkenhaus); and M. Williamson, "Eavesdropping on practical quantum cryptography," quantum-ph/0211155 (hereinafter, this document will be referred to as Williamson).

FIG. 2 is a flowchart showing a flow of quantum key generation in general. Among original random numbers for a cryptographic key (source of key) sent from Alice, most amount of the information is lost through quantum key distribution (single-photon transmission) S1. A key shared between Alice and Bob at this stage is called a raw key. The key that has lost approximately one half the mount of information after basis reconciliation S2 mentioned above, is called a sifted key. Thereafter, error correction S3 for correcting errors that were contained in the key at the stage of quantum key distribution is carried out, followed by privacy amplification S4 for eliminating the amount of information that conceivably has been leaked to an eavesdropper. Then, the remains are made to be a final key, which will be actually used as a cryptographic key. There have been proposed several techniques for sharing a quantum cryptographic key as described above.

For example, Japanese Patent Application Unexamined Publication No. 2000-174747 discloses a quantum cryptographic device that allows a sender and a receiver to share a secret key by using a quantum channel and a classical channel. Specifically, the sender extracts a bit value from a random number table, performs fine-modulation on an optical pulse in accordance with the extracted bit value, and sends the optical pulse through the quantum channel. The receiver independently extracts a bit value from another random number table, re-modulates the received optical pulse in accordance with the extracted bit value, and notifies the sender through the classical channel whether or not a photon is detected. The sender constructs a random number table using only the bit values for which a photon has been detected at the receiver. Thus, each of the sender and receiver stores the common random number table. Further, to check the presence/absence of eavesdropping, an appropriate number of check bits are extracted from each common random number table, and these are checked against each other through the classical channel. If a sufficient number of bits match, a bit string excluding the check bits is used as a shared secret key.

Japanese Patent Application Unexamined Publication No. 2004-112278 discloses a quantum key distribution method that improves the efficiency in generating a shared key by eliminating data errors caused by the propagation of a signal along a quantum communication path (quantum channel). Specifically, through the quantum communication path, a sender transmits a photon in a quantum state that is specified by a number from a random-number sequence (transmission data) and a randomly determined basis (transmission code). A receiver observes the received photon and obtains reception data that is specified by the result of this observation and a randomly determined basis (reception code. Thereafter, a procedure through a public communication path is carried out so that only those bits corresponding to the matching bases remain, whereby shared information is stored in each of the sender and receiver. Subsequently, through the public communication path, the sender transmits error correction information with a predetermined number of bits, formed from a parity check matrix and the transmission data. The receiver corrects errors in the reception data by using the received error correction information, the reception data, and the same parity check matrix. Depending on the information released in this error correction, part of the shared information after correction is discarded, and the remaining information is made to be a shared cryptographic key.

However, if an attempt is made to implement the above-described quantum key distribution in a real world, there are some cases where the above-mentioned error rate is increased due to various factors. Specifically, since information is superimposed on single photons for transmission, many of bits are lost on the way along a transmission line. Consequently, incorrect recognition of a bit-to-bit correspondence is likely to occur between the sender and the receiver. This incorrect recognition causes deterioration in the error rate, and resultantly, generation of a cryptographic key cannot be performed. Hereinafter, a state where synchronization of bit positions is established between Alice and Bob, that is, a state where correct recognition of a bit-to-bit correspondence is established between Alice and Bob, will be referred to as "frame synchronization." In addition, a state where a bit-to-bit correspondence is incorrectly recognized will be referred to as "frame synchronization deviation," and the processing for correctly adjusting the state of frame synchronization deviation to the state of frame synchronization will be referred to as "frame synchronization processing."

As described above, for the sender and receiver to share information, both of the sender and receiver must specify which bit has been correctly detected and which bit has not. In other words, in a quantum key distribution system, it is necessary to establish bit-position synchronization between the sender and receiver. In a key generation flow, it is a precondition that bit-position synchronization is established. If this synchronization is not established, a final key cannot be generated.

However, according to the above-described conventional schemes, there remains a possibility that a loss of frame synchronization occurs due to the extension/contraction of a transmission line and/or a processing deviation inside a device. When a loss of synchronization occurs in a real operation, it is recognized as an eavesdropper being detected, because no sufficient number of check bits match according to the key generation flow described in Japanese Patent Application Unexamined Publication No. 2000-174747. Therefore, bit-position synchronization is established again, and then key generation is carried out. This makes the entire key that has been generated through quantum communication go to waste, extremely degrading the efficiency in generating a shared key. Similarly, according to the method described in Japanese Patent Application Unexamined Publication No. 2004-112278 as well, when bit-position synchronization is lost, the error rate of reception data becomes very large, resulting in it being impossible to generate a shared key. In this publication, no consideration is given to the processing in the case of a large error rate.

SUMMARY OF THE INVENTION

The present inventors propose a synchronization control method by which accurate frame synchronization is quickly established, with attention focused particularly on the fact that the factors for the frame synchronization deviation are related not only with a processing deviation between devices due to the extension/contraction of a transmission line and the like, but also with a processing deviation inside the receiving-side device.

In order to achieve the above object of the present invention, an method for establishing bit-to-bit correspondence of data to be shared between a first communication device and a second communication device, which are connected through a plurality of communication channels, includes: a) at the first communication device, transmitting first data to the second communication device through a first communication channel, wherein the first data comprises a plurality of bits each positioned at sequential bit timings; b) at the second communication device, storing second data which has been received from the first communication device through the first communication channel; c) provisionally setting a first sync deviation and a second sync deviation, wherein the first sync deviation is a bit-timing difference between the first and second communication devices, and the second sync deviation is a bit-timing difference within the second communication device; d) comparing a part of the second data to a corresponding part of the first data while sequentially changing the first sync deviation and the second sync deviation within a predetermined adjustment range; and e) determining the first and second sync deviations based on a comparison result of the d).

According to an embodiment of the present invention, the d). includes: d.1) determining bit timings of the first data each corresponding to bit timings of a part of the second data based on provisional first and second sync deviations; d.2) comparing each bit value of the part of the second data to a corresponding bit value of the first data; d.3) changing at least one of the provisional first and second sync deviations by a predetermined step; and d.4) repeating the d.1) to the d.3) within the predetermined adjustment range. Preferably, in the e), the provisional first and second sync deviations providing a best one of comparison results of the d) are determined as the established bit-to-bit correspondence.

According to another embodiment of the present invention, the d) includes: d.1) determining bit timings of the first data each corresponding to bit timings of a part of the second data based on provisional first and second sync deviations; d.2) comparing each bit value of the part of the second data to a corresponding bit value of the first data; d.3) when a comparison result of the d.2) is not better than a predetermined threshold, changing at least one of the provisional first and second sync deviations by a predetermined step; and d.4) repeating the d.1) to the d.3) within the predetermined adjustment range, wherein in the e), when the comparison result of the d.2) is better than the predetermined threshold, the provisional first and second sync deviations providing such a comparison result are determined as the established bit-to-bit correspondence.

According to still another embodiment of the present invention, the d) and e) includes: f.1) determining bit timings of the first data each corresponding to bit timings of a part of the second data based on provisional first and second sync deviations; f.2) comparing each bit value of the part of the second data to a corresponding bit value of the first data; f.3) when a comparison result of the f.2) is not better than a first threshold, changing the provisional first sync deviation by a predetermined step; f.4) repeating the f.1) to the f.3) within a predetermined adjustment range of the first sync deviation; f.5) when the comparison result of the f.2) is better than the first threshold, the provisional first sync deviation providing such a comparison result is determined as the established first sync deviation; f.6) when a comparison result of the f.2) is better than the first threshold and is not better than a second threshold, changing the provisional second sync deviation by a predetermined step; f.7) comparing each bit value of the part of the second data to a corresponding bit value of the first data; f.8) when the comparison result of the f.7) is not better than the second threshold, repeating the f.6) to the f.7) within a predetermined adjustment range of the second sync deviation; and f.9) when the comparison result of the f.7) is better than the second threshold, the provisional second sync deviation providing such a comparison result is determined as the established second sync deviation.

According to the present invention, part of the second data on the receiver side is checked against the corresponding part of the first data on the sender side while sequentially changing the values of the first and second synchronization deviations within a predetermined adjustment range. Based on the result of this checking, the first synchronization deviation and the second synchronization deviation are determined. Therefore, since consideration is given not only to a processing deviation between the first and second communication devices but also to a processing deviation inside the second communication device, accurate frame synchronization can be established quickly. Accordingly, it is possible to achieve a stable and highly reliable communication system.

In the case of applying the present invention to a quantum key distribution system in particular, generation of a cryptographic key can be performed stably. According to the conventional quantum key distribution technologies, deterioration in the error rate (QBER) means the presence of an eavesdropper. However, according to the present invention, recovery processing can be carried out before generation of a cryptographic key is stopped, which eliminates the case where deterioration in the error rate due to an environmental change, a communication error or the like is misidentified as the presence of an act of eavesdropping. Therefore, even if deterioration in the error rate occurs, which should have caused key generation to be stopped in a conventional case, generation of a cryptographic key can be resumed. Accordingly, it is possible to achieve stable operation for cryptographic key generation over a long time.

BRIEF DESCRIPTION OF THE DRAWINGS

FIG. 7A is a schematic diagram showing a bit-to-bit correspondence in the case where the intra-device address difference $G_I$ is incorrect.

FIG. 7B is a diagram for describing estimated ranges of QBER in this case.

FIG. 8 is a sequence diagram showing a process of frame synchronization control to be performed between a sender and a receiver according to a first embodiment of the present invention.

FIG. 10 is a flowchart showing frame synchronization control according to a third embodiment of the present invention.

DETAILED DESCRIPTION OF THE PREFERRED EMBODIMENTS

Hereinafter, a quantum key distribution system will be described as a preferred mode of the present invention, although the present invention has a wide range of applications to communication systems that require data synchronization between a sender and a receiver. In particular, a plug and play scheme is considered as a promising scheme to put polarization-sensitive quantum key distribution systems into practical use because this scheme can compensate for polarization fluctuations occurring along an optical fiber transmission line (see G. Ribordy, "Automated 'plug & play' quantum key distribution," Electronics Letters, Vol. 34, No. 22, pp. 2116 to 2117, and W. Maeda, "High-Speed QKD System Synchronized by Automatic Phase-Alignment Mechanism," OFC2005, OWI4 (hereinafter, this document will be referred to as Maeda)).

1. System Configuration

Figure 3:
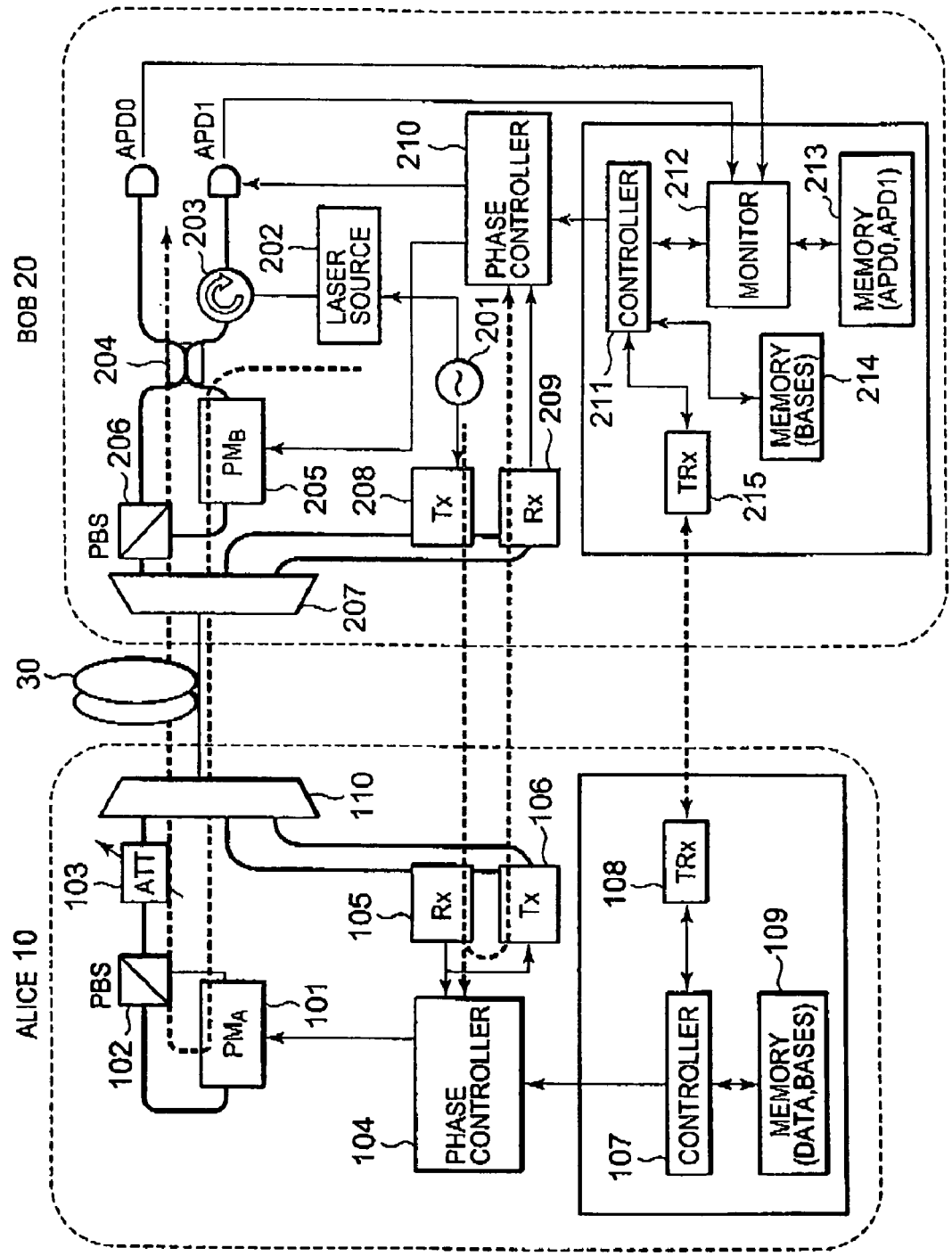
FIG. 3 is a block diagram showing a configuration of a plug and play quantum key distribution system according to a mode of the present invention.

FIG. 3 is a block diagram showing a configuration of a plug and play quantum key distribution system according to a mode of the present invention. In the quantum key distribution system according to this mode, a sender (Alice) 10 and a receiver (Bob) 20 are optically connected through an optical fiber transmission line 30.

1.1) Sender (Alice)

A quantum unit in the sender 10 has a variable optical attenuator 103 and a PBS loop including a phase modulator 101 and a polarization beam splitter (PBS) 102. The phase modulator 101 performs phase modulation on a sequence of optical pulses passing through it, in accordance with phase control signals supplied from a phase controller 104. The depths of phase modulation include four depths ($0, \pi/2, \pi, 3\pi/2$) corresponding to four combinations of a random number representing a basis (+/×), and a random number (0/1) representing source data for a key. A phase control signal is a voltage corresponding to any one of the modulation depths. The phase control signal is applied to the phase modulator 101 at the timing when an optical pulse is passing through the phase modulator 101, and thus the optical pulse is phase-modulated. The phase controller 104 applies the phase control signal to the phase modulator 101 in accordance with a synchronization clock received from an optical receiver 105, and this application timing and the applied voltage are controlled by a controller 107, which will be discussed later.

The PBS loop has a function similar to a faraday mirror. Light input to the PBS 102 from the receiver side is output with its polarization state rotated by 90 degrees (for details, see the specification of Japanese Patent Application No. 2004-335228 filed on Nov. 19, 2006 by the present applicant, and A. Tanaka, "Temperature independent QKD system using alternative-shifted phase modulation method," ECOC2004, Tu4.5.3). An optical signal input to the quantum unit from the receiver 20 is passed through the variable optical attenuator 103, turned around at the PBS loop as described above, passed through the variable optical attenuator 103 again, and then sent back to the receiver 20. The variable optical attenuator 103 is set at a small amount of attenuation in a training mode for synchronization between quantum units, and is set at a large amount of attenuation to accomplish single-photon transmission in a quantum mode for key generation.

Moreover, the sender 10 has two random number generators (not shown). The controller 107 causes one of the random number generators to generate the source data (0/1) for a cryptographic key and the other to generate the basis information (+/×), and sequentially stores the generated data and information in a memory 109. The bit number of each of the stored random numbers is managed by using an address in the memory 109, which will be discussed later. For the memory 109, it is preferable to use a memory that can achieve fast access. Here, SDRAM (Synchronous DRAM) is used.

When a key generation flow is started, the controller 107 allows the variable optical attenuator 103 to increase the amount of attenuation. Then, the controller 107 sequentially reads the sets of source data and basis information from the memory 109 one by one and outputs them to the phase controller 104. The phase controller 104 outputs a phase control signal corresponding to each set of source data and basis information to the phase modulator 101 in accordance with the synchronization clock, whereby a modulation at any one of the four depths ($0, \pi/2, \pi, 3\pi/2$) is performed on each of optical pulses passing through the phase modulator 101.

For the synchronization clock supplied to the phase controller 104, a reference clock received from the receiver 20 through the optical fiber transmission line 30 is used. The reference clock is converted into an electric signal by the optical receiver 105 and output to the phase controller 104. At the same time, this reference clock is also output to an optical transmitter 106 and returned to the receiver 20 as a reference clock. Additionally, the controller 107 exchanges control signals and data required for key generation, synchronization processing, correction processing and the like, with a controller 211 in the receiver 20 via an optical transceiver 108.

Wavelength division multiplexing transmission is used in the present mode. Different wavelengths are used for the quantum-unit communication, reference-clock exchanges, and data communication by the controller 107, respectively. The sender 10 is provided with a wavelength multiplexer/demultiplexer 110, which demultiplexes the wavelengths of optical signals input from the optical fiber transmission line 30 and outputs the respective optical signals to the variable optical attenuator 103, optical receiver 105 and optical transceiver 108. Reversely, the wavelength multiplexer/demultiplexer 110 multiplexes the wavelengths of respective optical signals output from the variable optical attenuator 103, optical receiver 105 and optical transceiver 108 and sends the optical signals out to the optical fiber transmission line 30. That is, a quantum channel used by the quantum unit and classical channels respectively used by the optical receiver 105, optical transmitter 106 and optical transceiver 108 are wavelength-multiplexed over the optical fiber transmission line 30.

1.2) Receiver (Bob)

A quantum unit in the receiver 20 according to the present mode has an optical circulator 203, an optical coupler 204, a phase modulator 205, a PBS 206, and photo detectors APD0 and APD1. A long path and a short path are provided in parallel between the optical coupler 204 and PBS 206. The phase modulator 205 is placed in the long path, and its driving timing and the depth of phase modulation (basis) are controlled with a phase control signal from a phase controller 210. The photo detectors APD0 and APD1 are avalanche photodiodes (APD) and are driven in the gated Geiger mode in accordance with a control signal from the phase modulator 210 (see A. Tomita, "Balanced, gated-mode photon detector for quantum-bit discrimination at 1550 nm," Optics letters, vol. 27 (2002), pp. 1827 to 1829 (hereinafter, this document will be referred to as Tomita)).

The receiver 20 is provided with a reference-clock source 201. A laser source 202 is driven in accordance with a reference clock generated by the reference-clock source 201, and at the same time, this reference clock is transmitted to the sender 10 via an optical transmitter 208. In the sender 10, the reference clock is used to determine the synchronization timing on one hand and is sent back to the receiver 20 as it is on the other hand. The reference clock returned from the sender 10 is received by an optical receiver 209 and supplied to the phase controller 210 as a synchronization clock for the receiver 20. Under control of the controller 211, the phase controller 210 controls the timing of applying voltage to the phase modulator 205, as well as the depth of phase modulation on the phase modulator 205, so that the timing is synchronized with the supplied reference clock. Moreover, the phase controller 210 controls the timing of applying reverse-bias voltage for photon detection to the photo detectors APD0 and APD1.

Further, the receiver 20 has a random number generator (not shown). The controller 211 causes the random number generator to generate basis information (+/x) and sequentially stores it in a memory 214. When a key generation flow is stated, the controller 211 sequentially reads the basis information from the memory 214 and outputs it to the phase controller 210. For the memory 214, a memory that can achieve fast access (here, SDRAM) is used. The phase controller 210 applies a phase control signal at a voltage corresponding to an output basis, to the phase modulator 205 in accordance with the reference clock. Thus, a modulation corresponding to the output basis can be performed on an optical pulse sent from the sender 10 at the timing when the optical pulse is passing through the phase modulator 205.

An optical pulse modulated by the phase modulator 101 in the sender 10 and an optical pulse modulated by the phase modulator 205 in the receiver 20 are made to interfere at the optical coupler 204, and a photon is detected by the photo detector APD0 or APD1, depending on the difference between the respective depths of phase modulation. Detection signals from the photo detectors APD0 and APD1 are sequentially written in a memory 213 as a raw key. Incidentally, the bit number of each data of the raw key written in the memory 213 and the bit number of each random number as basis information stored in the memory 214 are each managed by using an address in the respective memories, which will be described later. For the memory 213, a SDRAM that can achieve fast access is used here. Additionally, the memories 213 and 214 may be different areas in the same memory.

Subsequently, the bit numbers for the raw key stored in the memory 213 and the corresponding basis information stored in the memory 214 are notified to the controller 107 in the sender 10, and basis reconciliation is carried out as described above to discard those random-number bits corresponding to non-matching bases. In this event, as to those bits corresponding to matching bases, it is also detected whether or not the detection data stored in the memory 213 match the source data stored in the memory 109, and the error rate QBER is calculated. A monitor 212 always monitors a change in QBER while storing the calculated error rate QBER in the memory 213. Depending on the value of the error rate QBER or the amount of change in QBER, the controller 211 appropriately carries out undermentioned phase correction processing or flame synchronization processing.

As described above, wavelength division multiplexing transmission is used in the present mode, and different wavelengths are used for the quantum-unit communication, reference-clock exchanges, and data communication such as basis reconciliation by the controller 211, respectively. The receiver 20 is provided with a wavelength multiplexer/demultiplexer 207, which demultiplexes the wavelengths of optical signals input from the optical fiber transmission line 30 and outputs the respective optical signals to the PBS 206, optical receiver 209 and optical transceiver 215. Reversely, the wavelength multiplexer/demultiplexer 207 multiplexes the wavelengths of respective optical signals output from the PBS 206, optical transmitter 208 and optical transceiver 215 and sends the optical signals out to the optical fiber transmission line 30.

2. System Operation

An optical pulse P output from the laser source 202 in accordance with the clock signal supplied from the reference-clock source 201 is led into the optical coupler 204 by the optical circulator 203 and split into two parts at the optical coupler 204. One of the two parts, an optical pulse P1, is allowed along the short path and directly sent to the PBS 206, whereas the other, an optical pulse P2, is passed through the phase modulator 205 placed in the long path and then sent to the PBS 206. These optical pulses P1 and P2 are combined at the PBS 206 and transmitted to the sender 10 as double pulses after passing through the wavelength multiplexer/demultiplexer 207 and optical transmission path 30.

In the sender 10, each of the double pulses P1 and P2 arriving after passing through the optical transmission line 30, wavelength multiplexer/demultiplexer 110 and variable optical attenuator 103 is further split into two parts at the PBS 102, resulting in four pulses (i.e., quartet pulses) including clockwise double pulses $P1_{CW}$ and $P2_{CW}$ and counterclockwise double pulses $P1_{CCW}$ and $P2_{CCW}$. Each pair passes through the phase modulator 101 in the direction opposite to the other pair and enters a PBS port that is different from a port from which it was output.

The phase modulator 101 performs phase modulation on the pulse $P2_{CW}$, the following one of the clockwise double pulses $P1_{CW}$ and $P2_{CW}$, with respect to the preceding pulse $P1_{CW}$, and also gives a phase difference of $\pi$ between the clockwise double pulses and the counterclockwise double pulses. The phase modulator 101 is timing-controlled so as to perform an arbitrary phase modulation on each of the quartet pulses in accordance with a phase control signal from the phase controller 104.

The quartet pulses thus phase-modulated as required are combined at the PBS 102, returning to double pulses again. The output double pulses are denoted by P1 and $P2^{*a}$ because, as described above, only the following pulse of the clockwise double pulses is phase-modulated based on transmission information. At this point, when each pulse is output, the polarization is rotated by 90 degrees with respect to the polarization when it was input. Consequently, an effect similar to a faraday mirror can be obtained.

In the receiver 20, since the polarization states of the optical pulses P1 and $P2^{*a}$ received from the sender 10 each have been rotated by 90 degrees, the PBS 206 leads each of these received pulses to a path different from the path the pulse used when it was transmitted. Specifically, the received optical pulse P1 goes along the long path and is phase-modulated with a designated basis at the timing when it is passing through the phase modulator 205, resulting in a phase-modulated optical pulse $P1^{*b}$, which arrives at the optical coupler 204. On the other hand, the optical pulse $P2^{*a}$ travels along the short path that is different from the path it used at the time of transmission from the receiver 20, and arrives at the same optical coupler 204.

In this manner, the optical pulse $P2^{*a}$ phase-modulated in the sender 10 and the optical pulse $P1^{*b}$ phase-modulated in the receiver 20 are made to interfere with each other, and the result of this interference is detected by the photon detector APD0 or APD1. The photon detectors APD0 and APD1 are driven in the gated Geiger mode in accordance with the clock signal supplied from the phase controller 210. Detection data obtained by the photon detectors APD0 and APD1 are sequentially stored in the memory 213. The monitor 212 monitors QBER calculated at the time of basis reconciliation.

The controller 211 compares the error rate QBER with threshold values ($Q_{bit}$, $Q_{phase}$, etc.) stored in advance and, when necessary, carries out the processing for recovering frame synchronization. Hereinafter, detailed description will be given of frame synchronization control methods according to preferred embodiments of the present invention. The frame synchronization control methods according to these embodiments are carried out by the controller 107 in the sender 10, and the controller 211 and monitor 212 in the receiver 20. However, similar functions may be implemented by executing a frame synchronization control program on respective program-controlled processors of the sender 10 and the receiver 20.

Figure 4:
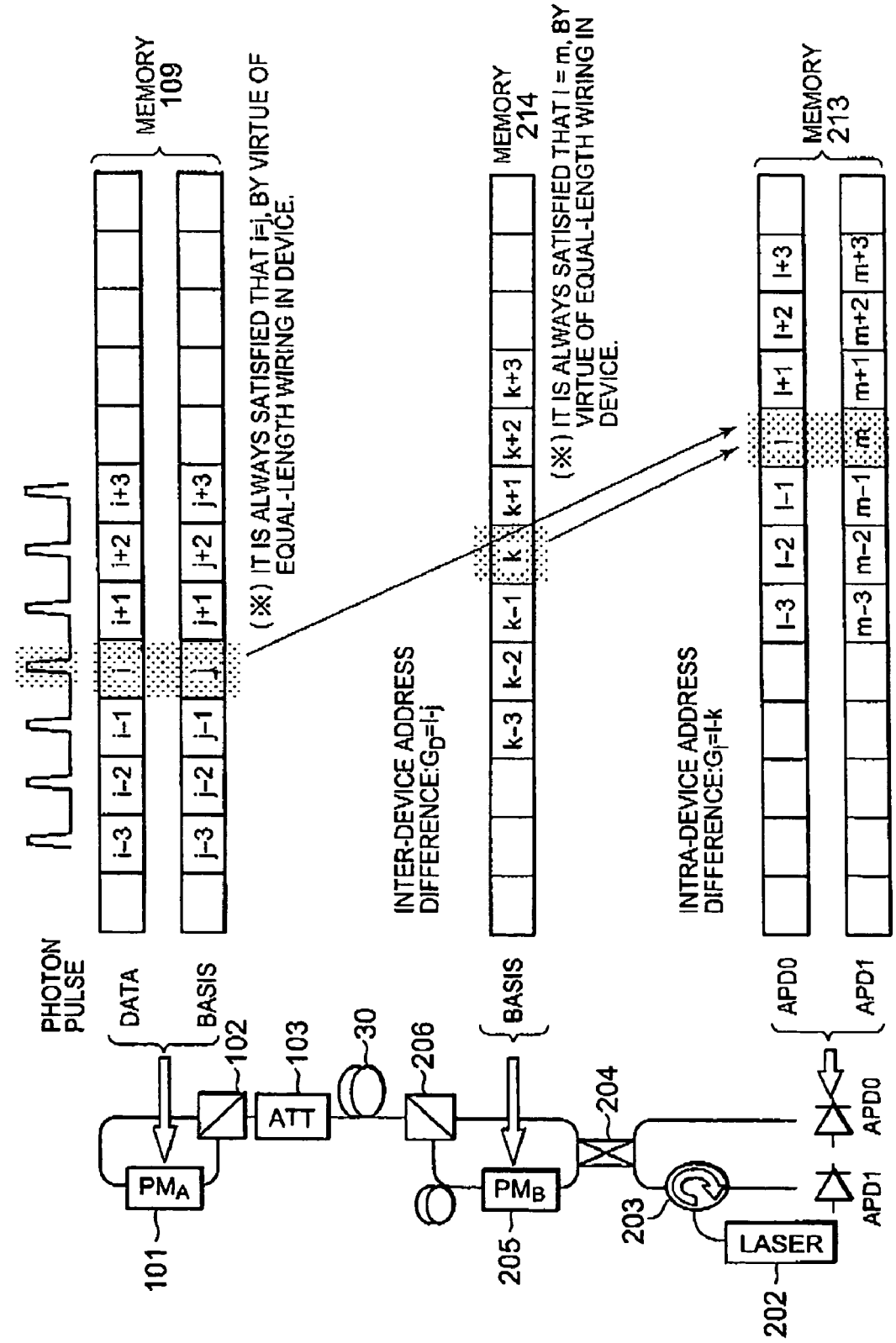
FIG. 4 is a schematic diagram showing that bit numbers deviate due to a propagation delay between devices and a propagation delay inside a device, in a quantum key distribution system.

3. First Embodiment 3.1) Definitions of Inter-device Processing Deviation and Intra-device processing Deviation FIG. 4 is a schematic diagram showing that bit numbers deviate due to a propagation delay between the devices (inter-device propagation delay) and due to a propagation delay inside a device (intra-device propagation delay), in a quantum key distribution system. As mentioned above, the bit numbers of data and the bit numbers of bases are managed by using the addresses in the memories.

In the memory 109 of the sender 10, the random numbers corresponding to the source data for a cryptographic key are respectively stored at addresses (. . . i−3, i−2, i−1, i, i+1, . . .), and the random numbers corresponding to the basis information are respectively stored at addresses (. . . j−3, j−2, j−1, j, j+1, . . .). Here, it is assumed that i and j correspond to each other. When modulation is performed by the phase modulator 101, the controller 107 reads a random number (source data) and a basis from respective addresses i and j in the memory 109, and the phase modulator 101 phase-modulates an optical pulse at the modulation depth corresponding to the combination of the random number and the basis. However, it is assumed that there is no delay difference between reading from the addresses i and reading from the addresses j, by virtue of a delay equalizing design for the inside of the device, so that it is always satisfied that i=j.

In the receiver 20, each of the double pulses sent from the sender 10 is led by the PBS 206 to a path different from the path it used when it was transmitted from the receiver 20, as described above. One of the double pulses goes along the short path and arrives at the optical coupler 204 as it is, whereas the other pulse goes along the long path and arrives at the optical coupler 204 after phase-modulated by the phase modulator 205. When the phase modulator 205 performs phase modulation, the controller 211 reads a basis from an address (k) in the memory 214, and the phase modulator 205 phase-modulates the optical pulse at the modulation depth corresponding to this basis.

Data detected by the photo detectors APD0 and APD1 are sequentially written at addresses l and m in the memory 213, respectively. In this case as well, it is assumed that there is no delay difference between writing into the addresses l and writing into the addresses m, by virtue of delay equalizing design for the inside of the device, so that it is always satisfied that l=m.

As described above, the read addresses i and j in the memory 109 of the sender 10, the read addresses k in the memory 214 of the receiver 20, and the write addresses l and m in the memory 213 of the receiver 20 all have different values from each other. To correctly identify which bit on the sender side corresponds to which bit on the receiver side, it is necessary to determine address-to-address correspondences among these memories in advance.

Here, assuming that it is always satisfied that i=j and l=m, the difference between a modulation address (i) in the memory 109 of the sender 10 and a detection address (l) in the memory 213 of the receiver 20 will be referred to as an inter-device address difference $G_D$ (=l−i) or an inter-device address/bit deviation, and the difference between a modulation address (k) and a detection address (l) inside the receiver 20 will be referred to as an intra-device address difference $G_I$ (=l−k) or an intra-device address/bit deviation.

3.2) Frame Sync Deviation and QBER Deterioration

When the inter-device address deviation $G_D$ and/or intra-device address deviation GI fluctuate due to change in temperature and the like, QBER varies as follows. Note that for simplicity, it is assumed that all the bits transmitted from Alice arrive at Bob.

a) Where $G_D$ and $G_I$ are Both Correct

Figure 5:
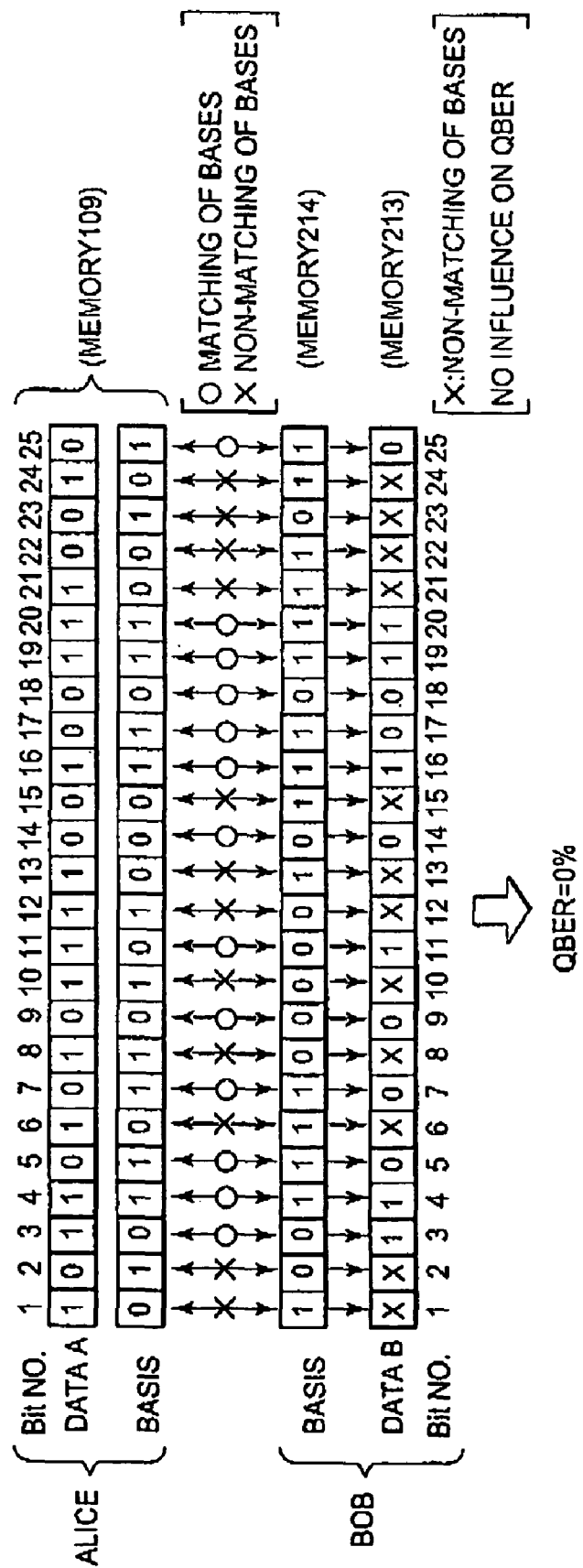
FIG. 5 is a schematic diagram showing a bit-to-bit correspondence in the case where an address difference between devices (inter-device address difference) $G_D$ and an address difference inside a device (intra-device address difference) $G_I$ are both correct.

FIG. 5 is a schematic diagram showing a bit-to-bit correspondence in the case where the inter-device address difference $G_D$ and intra-device address difference $G_I$ are both correct. In the calculation of QBER, the rate of data matching is calculated only as to those bits corresponding to the matching bases used for modulation at Alice and Bob. As shown in FIG. 5, those bits corresponding to the non-matching bases are not involved with the error rate. As for the bits corresponding to the matching bases, the data A on the Alice's side match the data B on the Bob's side, and therefore QBER is 0%.

b) Where $G_D$ is Incorrect

Figure 6:
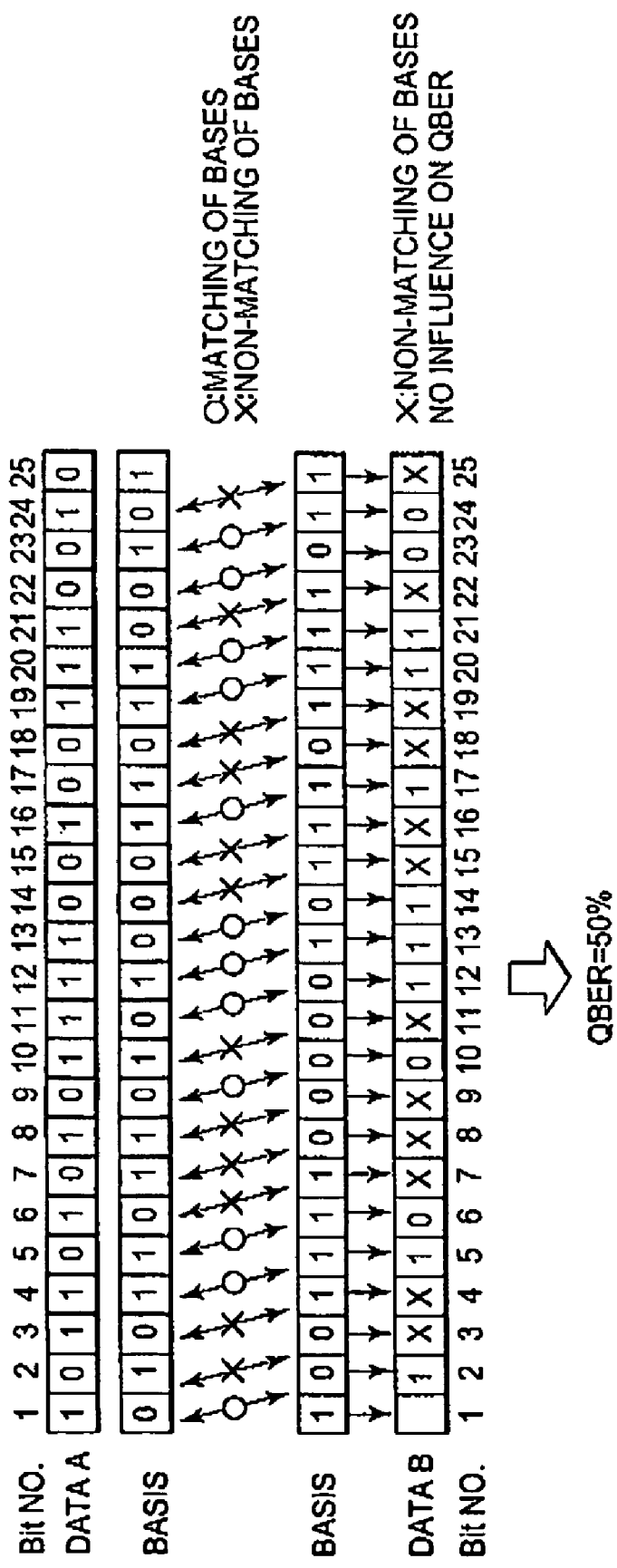
FIG. 6 is a schematic diagram showing a bit-to-bit correspondence in the case where the inter-device address difference $G_D$ is incorrect.

FIG. 6 is a schematic diagram showing a bit-to-bit correspondence in the case where the inter-device address difference $G_D$ is incorrect. In this case, when basis reconciliation is performed, the bits to be compared are wrong ones. Accordingly, comparison is carried out between the deviated, uncorrelated random numbers, with the result that QBER is approximately 50%. However, depending on the number of bits involved with the calculation of QBER, a frame synchronization deviation might occur within the calculation range, or the result of calculation itself might have variations and the like. With consideration given to these points, if the result of QBER calculation falls within the range of approximately 30% to 60%, it can be determined that a frame synchronization deviation in the case of incorrect $G_D$ has occurred. Therefore, as a reference to determine this frame synchronization deviation attributable to incorrect $G_D$, an inter-device frame-sync deviation threshold value $Q_{bit}$ is set within the range of 30% to 60%.

c) Where GI is Incorrect

FIG. 7A is a schematic diagram showing a bit-to-bit correspondence in the case where the intra-device address difference $G_I$ is incorrect, and FIG. 7B is a diagram for describing estimated ranges of QBER in this case. As shown in FIG. 7A, in this case, inside Bob, the write addresses of the detection signals deviate from the addresses of the basis information used for modulation at Bob. Therefore, the calculation of QBER is not as simple as the above-described cases (a) and (b) and needs to be considered in separate cases as shown in FIG. 7B.

First, it is assumed that a photon modulated in Alice at the i-th bit is modulated in Bob at the (i+1)-th bit and received at the i-th bit. However, Bob incorrectly recognizes that the photon is modulated in itself at the i-th bit.

The probability that a match occurs between $Basis_{Ai}$ at the i-th bit in Alice and $Basis_{Bi}$ at the i-th bit in Bob and the probability that no match occurs are both 50%. However, since QBER is not affected when the bases at the i-th bit do not match ($Basis_{Ai} \neq Basis_{Bi}$), it is sufficient to consider only the case where a match occurs ($Basis_{Ai} = Basis_{Bi}$).

As mentioned above, in Bob, it is the basis at the (i+1)-th bit that was actually used to modulate the photon. Accordingly, when $Basis_{Bi+1}$ at the (i+1)-th bit is the same as $Basis_{Bi}$ at the i-th bit ($Basis_{Bi}$=$Basis_{Bi}$+1), the photon can be received without an error (100%). When these bases are different ($Basis_{Bi}\neq Basis_{Bi}$+1), the photon is incorrectly received with a probability of 50%.

Accordingly, the probability that a bit results in an error is 25% (=50% * 50%). Depending on the number of bits involved with the calculation of QBER, a frame synchronization deviation might occur within the calculation range, or the result of calculation itself might have variations and the like. With consideration given to these points, if the result of QBER calculation falls within the range of approximately 15% to 30%, it can be determined that a frame synchronization deviation in the case of incorrect $G_I$ has occurred. Therefore, as a reference to determine this frame synchronization deviation attributable to incorrect $G_I$, an intra-device frame-sync deviation threshold value $Q_{in}$, is set within the range of 15% to 30%.

A frame synchronization deviation in each of the above-described cases is caused by an error in processing by CPU, an error in communication between Alice and Bob, and the like. However, QBER can be restored to the value before deterioration by performing frame synchronization processing as described below.

3.3) Frame Sync Control

Hereinafter, frame synchronization control according to the present embodiment will be described in detail.

FIG. 8 is a sequence diagram showing a process of the frame synchronization control performed between the sender and receiver according to the first embodiment of the present invention. First, the controller 211 in the receiver (Bob) 20 provisionally sets $G_I'$ as an approximate value of the intra-device address difference $G_I$. When a photon is detected at the timing corresponding to an address l or m in the memory 213 (hereinafter, this timing will be referred to as "l-th bit"), the controller 211 transmits to the sender 10 the detection data (0/1) at the address in question and the bases stored in a predetermined range of (l -$G_I'$) to (l-$G_I'$+gi) around the corresponding address (k) in the memory 214. Here, "gi" represents an adjustment range of the intra-device address difference $G_I$.

The controller 107 in the sender (Alice) 10 provisionally sets $G_D'$ as an approximate value of the inter-device address difference $G_D$. Each combination of the detection data at the l-th bit and the bases (Bob) at the (l -$G_I'$)-th to (l-$G_I'$+gi)-th bits, received from the receiver 20, is checked against each data and basis (Alice) stored in a predetermined range of (l-$G_D'$) to (l-$G_D'$+gd) around the corresponding (l-$G_D'$)-th bit in the memory 109, and QBER is calculated each time. Here, "gd" represents an adjustment range of the inter-device address difference $G_D$. In this manner, the values of $G_D$ and $D_I$ that minimize QBER are determined. After frame synchronization is thus established, cryptographic key extraction is performed by using these determined difference values ($G_D$ and $D_I$)

Here, the error rate QBER can be calculated as follows. Each of the bases (Alice) at the (l-$G_D'$)-th to (l-$G_D'$+gd)-th bits is checked against each of the bases (Bob) at the (l-$G_I'$)-th to (l-$G_I'$+gi)-th bits, and as to each bit corresponding to matching bases, the rate of data matching between the corresponding source data stored in the memory 109 on the Alice's side and the detection data at the l-th bit on the Bob's side, is calculated as QBER.

As described above, according to the first embodiment, $G_D$ and $G_I$ are changed so that every possible combination of $G_D$ and $G_I$ is tried, and the values of $G_D$ and $D_I$ that minimize QBER are determined as the address differences that have established frame synchronization, and are used in the subsequent cryptographic key generation process. However, as a realistic problem, there is a possibility that the bit-position synchronization is lost due to the extension/contraction of the optical transmission line caused by change in temperature, the delay variation among electric circuits inside the receiver, and the like. Therefore, it is preferable that the error rate QBER or the like, as a monitored item, should be always monitored, and when the quality of communication is degraded, $G_D$ and $D_I$ should be reset by carrying out the above-described frame synchronization processing.

4. Second Embodiment

Figure 9:
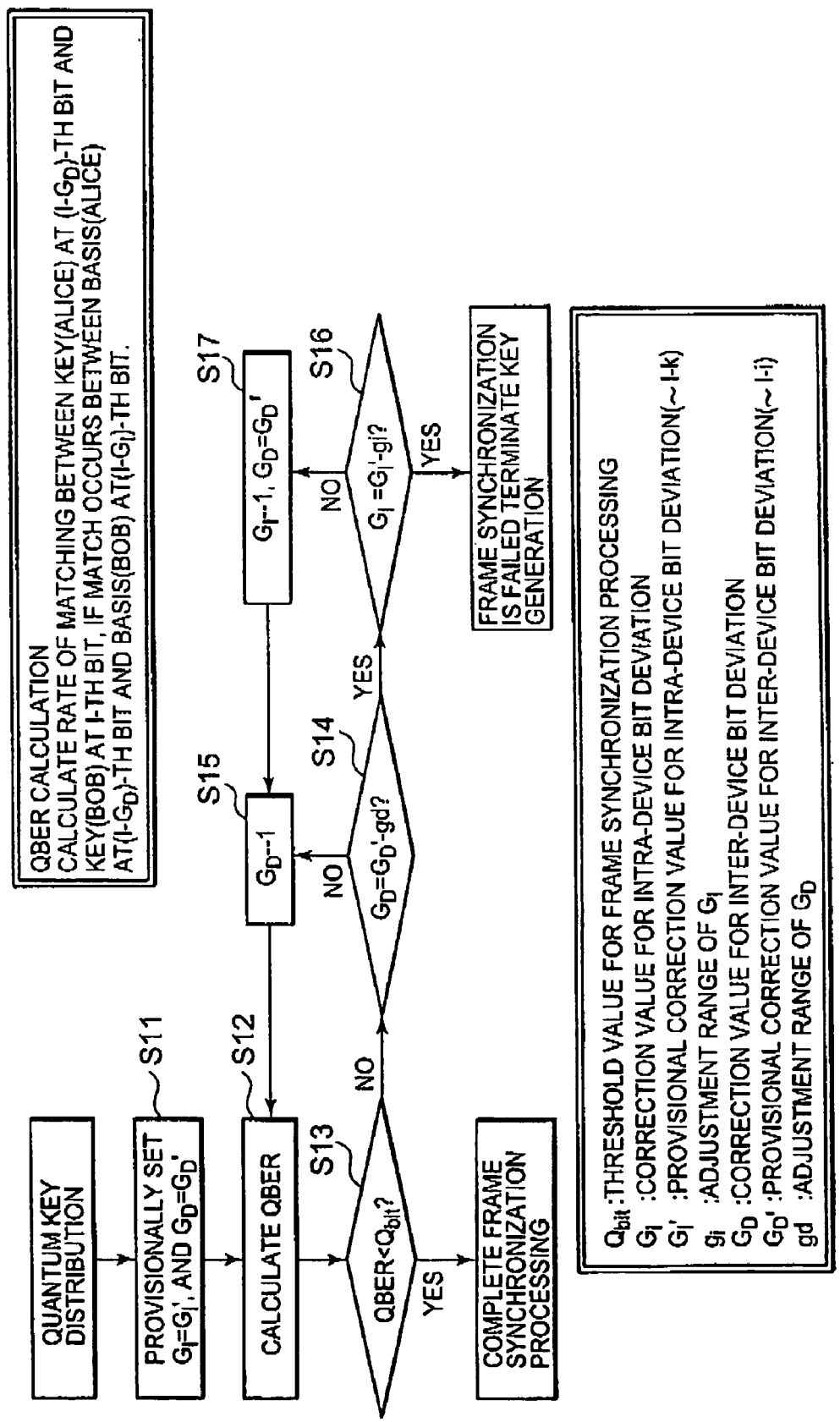
FIG. 9 is a flowchart showing frame synchronization control according to a second embodiment of the present invention.

FIG. 9 is a flowchart showing frame synchronization control according to a second embodiment of the present invention. In this embodiment, $G_D$ and $D_I$ are changed so that every possible combination of $G_D$ and $G_I$ is tried, and when QBER falls below a threshold value $Q_{bit}$ for frame synchronization processing, the frame synchronization is complete with the then values of $G_D$ and $G_I$.

Referring to FIG. 9, after quantum key distribution, it is provisionally set that $G_I$=$G_I'$ and $G_D$=$G_D'$ (S11. Here, $G_I'$ is a provisional correction value for an intra-device bit deviation (an estimated value of (l-k)), and $G_D'$ is a provisional correction value for an inter-device bit deviation (an estimated value of (l-i))

Subsequently, QBER is calculated (S12) by calculating the rate of data matching between the source data stored at the (l-$G_D$)-th bit in the memory 109 on the Alice's side and the detection data stored at the l-th bit in the memory 213 on the Bob's side, for bits where a match occurs between the basis at the (l-$G_D$)-th bit in the memory 109 on the Alice's side and the basis at the (l-$G_I$) -th bit in the memory 214 on the Bob's side.

Next, the calculated QBER is compared with the threshold value $Q_{bit}$ for frame synchronization processing (S13. When QBER is equal to or larger than $Q_{bit}$ (S13: No), it is determined whether or not $G_D$ reaches the lower limit ($G_D$'gd) of an adjustment range (S14). If $G_D$ can be further adjusted (S14: NO), $G_D$ is decremented by one (S15), and then the process returns to the step S12.

In this manner, $G_D$ is sequentially decremented by one until $G_D$ reaches ($G_D$'gd) and, every time $G_D$ is decremented, QBER is calculated. When QBER <$Q_{bit}$ (S13: YES) during this process, the frame synchronization processing is completed.

When $G_D$ reaches ($G_D$'gd) (S14: Yes), it is determined whether or not GI reaches the lower limit ($G_I$'gi) of an adjustment range (S16). If $G_I$ can be further adjusted (S16: No), $G_I$ is decremented by one, and at the same time, $G_D$ is reset to the initial provisional set value $G_D'$ (S17). Then, the above-described steps S12 to S15 are repeated. That is, while decrementing GI by one, the steps S12 to S15 are repeated until GI reaches ($G_I$'gi). Every time $G_I$ is decremented, QBER is calculated. When QBER <$Q_{bit}$ (S13: YES) during this process, the frame synchronization processing is completed.

When $G_I$ reaches ($G_I'$ gi) without QBER becoming smaller than $Q_{bit}$ (S16: Yes), since it means that QBER is not improved even after every possible value of $G_D$ and $G_I$ has been tried, it is determined that the frame synchronization is failed, and the key generation is stopped.

5. Third Embodiment

FIG. 10 is a flowchart showing frame synchronization control according to a third embodiment of the present invention. In this embodiment, utilizing the fact that QBER is 50% when $G_D$ is incorrect and QBER is 25% when only $G_I$ is incorrect as described above, $G_D$ is determined first, and then $G_I$ is determined.

Referring to FIG. 10, after quantum key distribution, it is provisionally set that $G_I=G_I'$ and $G_D=G_D'$ (S11) Subsequently, QBER is calculated (S12) by calculating the rate of data matching between the source data stored at the $(l-G_D)$-th bit in the memory 109 on the Alice's side and the detection data at the l-th bit stored in the memory 213 on the Bob's side, if a match occurs between the basis at the $(l-G_D)$-th bit in the memory 109 on the Alice's side and the basis at the $(l-G_I)$-th bit in the memory 214 on the Bob's side.

Next, the calculated QBER is compared with a threshold value $Q_{bit}$ for inter-device frame synchronization processing (S13). When QBER is equal to or larger than $Q_{bit}$ (S13: No), it is determined whether or not $G_D$ reaches the lower limit ($G_D'$ gd) of an adjustment range (S14). If $G_D$ can be further adjusted (S14: NO), $G_D$ is decremented by one (S15), and then the process returns to the step S12.

In this manner, $G_D$ is sequentially decremented by one until $G_D$ reaches ($G_D'$-gd) and, every time $G_D$ is decremented, QBER is calculated. When $G_D$ reaches ($G_D'$-gd) without QBER becoming smaller than $Q_{bit}$ (S14: Yes), it is determined that the frame synchronization is failed, and the key generation is stopped.

When QBER $<Q_{bit}$ (S13: Yes), QBER is next compared with a threshold value $Q_{in}$ for intra-device frame synchronization processing (S21). When QBER is equal to or larger than $Q_{in}$ (S21: No), it is determined whether or not $G_I$ reaches the lower limit ($G_I'$-gi) of an adjustment range (S22). If $G_I$ can be further adjusted (S22: NO), $G_I$ is decremented by one (S23), and QBER is calculated (S24), and then the process returns to the step S21.

In this manner, $G_I$ is sequentially decremented by one until $G_I$ reaches ($G_I'$-gi) and, every time $G_I$ is decremented, QBER is calculated. When QBER $<Q_{in}$ (S21: Yes), the frame synchronization is complete. When $G_I$ reaches ($G_I'$-gi) without QBER becoming smaller than $Q_{in}$ (S21: Yes), it is determined that the frame synchronization is failed, and the key generation is stopped.

6. Application Example 1

As described above, according to the present invention, $G_D$ and $G_I$ are changed, and the values of $G_D$ and $G_I$ that minimize QBER, or provide QBER lower than a threshold value, are determined as the address differences that have established frame synchronization, and are used in the subsequent cryptographic key generation. However, as a realistic problem, there is a possibility that the bit-position synchronization is lost due to the extension/contraction of the optical transmission line caused by change in temperature, the delay variation among electric circuits inside the receiver, and the like. Therefore, it is necessary that the error rate QBER or the like, as a monitored item, should be always monitored, and when the quality of communication is degraded, $G_D$ and $D_I$ should be reset by carrying out the above-described frame synchronization processing. Hereinafter, a first application example of the present invention will be described.

Figure 11A:
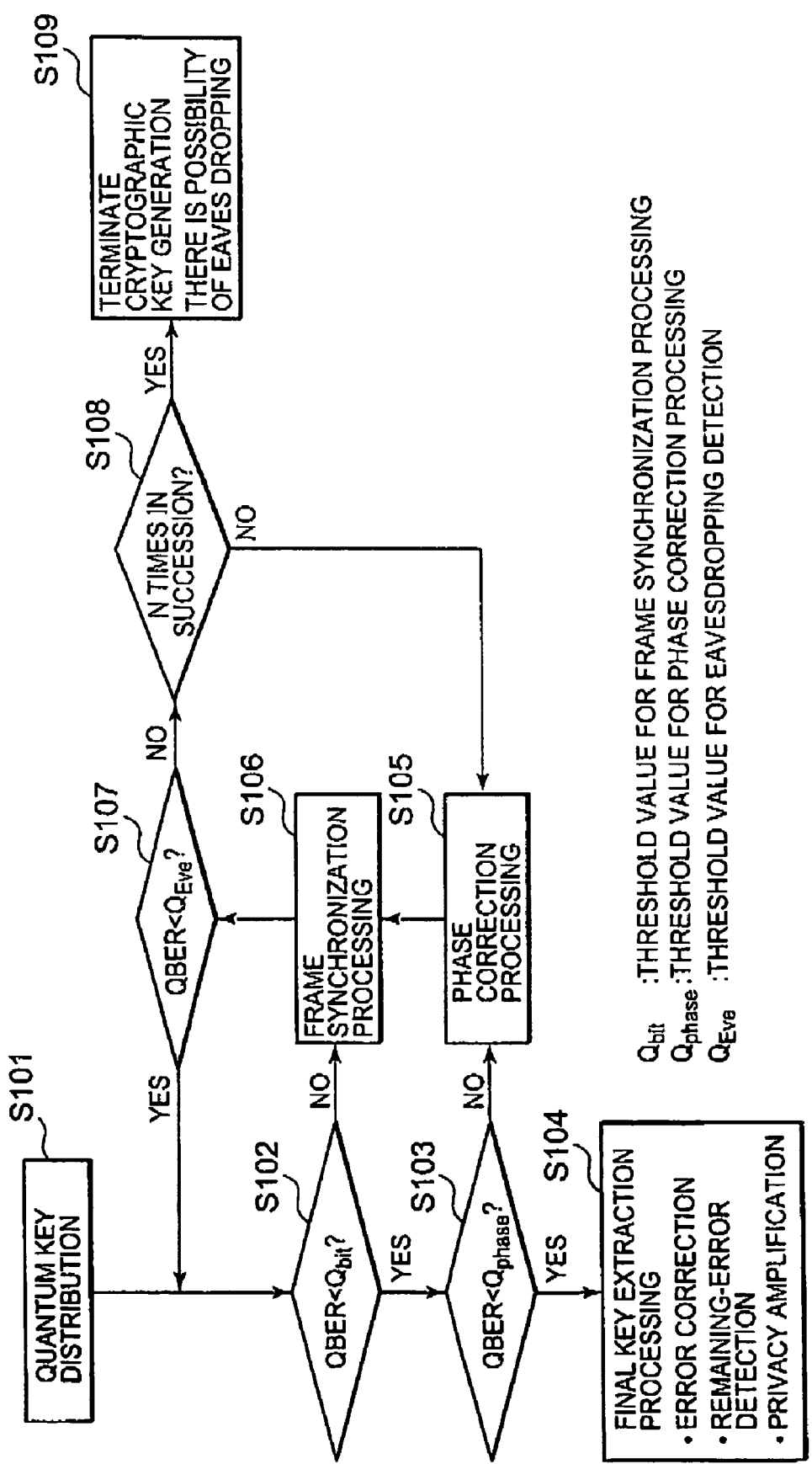
FIG. 11A is a flowchart showing an example of the monitoring and control of a network utilizing the frame synchronization processing according to the present invention.
Figure 11B:
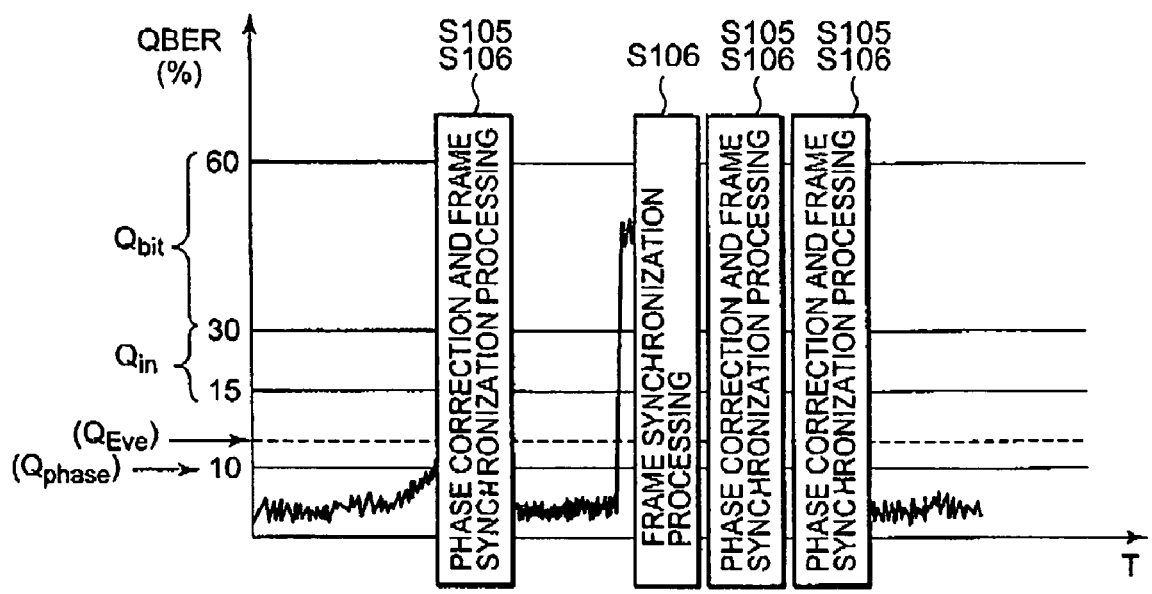
FIG. 11B is a graph schematically showing an example of phase correction processing and frame synchronization processing performed in accordance with change in the error rate QBER.

FIG. 11A is a flowchart showing an example of the monitoring and control of a network, utilizing the frame synchronization processing according to the present invention, and FIG. 11B is a graph schematically showing an example of the phase correction processing and frame synchronization processing performed in accordance with change in the error rate QBER. In the present application example, detection of a system fault and work of system recovery are performed based on the sequence shown in FIG. 11A.

As described above, the monitor 212 monitors QBER calculated in a step of quantum key distribution S101, and the controller 211 compares QBER with the threshold value $Q_{bit}$ for frame synchronization processing (S102). When QBER $<Q_{bit}$, the controller 211 further compares QBER with the threshold value $Q_{phase}$ for phase correction processing (S103). When QBER $<Q_{phase}$ (S103: Yes), each processing in the subsequent flow of key generation, including error correction, remaining-error detection and privacy amplification here, is carried out (S104).

On the other hand, in the case where although QBER $<Q_{bit}$ (S102: Yes), QBER is deteriorated more than the threshold value $Q_{phase}$ for phase correction processing (S103: No), then phase correction processing is carried out (S105). Here, a "phase deviation" refers to a deviation of the clock timing from the timing of the passage/arrival of a photon. For the "phase correction processing," a method using the phase alignment described in Maeda may be employed. Alternatively, other methods may be employed, such as sequentially shifting the clock timing by controlling the phase controller using the monitor 212 to set the clock timing at the position that minimize QBER.

When the phase correction processing S105 has finished, the frame synchronization processing is next carried out (S106). As defined already, "frame synchronization" refers to a state where the synchronization of information bits is established between the sender and the receiver, that is, a state where the correct recognition of a bit-to-bit correspondence is established between the sender and the receiver. A "frame synchronization deviation" refers to a state where the bit-to-bit correspondence is incorrectly recognized. Moreover, the "frame synchronization processing" refers to the processing of resetting the bit-to-bit correspondence at the position that minimizes QBER while shifting the bit-to-bit correspondence. More specific description thereof will be given in the paragraph on the frame synchronization processing below.

When the frame synchronization processing S106 has finished, the controller 211 compares QBER recalculated with a threshold value $Q_{Eve}$ for eavesdropping detection (S107). When QBER $<Q_{Eve}$ (S107: Yes), the process returns to the step S102 again.

On the other hand, if QBER is deteriorated more than the threshold value $Q_{bit}$ for frame synchronization processing (S102: No), the above-described frame synchronization processing (S106) is carried out, and subsequently the step S107 is carried out.

Here, the reason why the frame synchronization processing S106 is carried out after the phase correction processing S105, is that there is a possibility that the clock phase is changed by the phase correction processing, which might induce a frame synchronization deviation. Moreover, in making a comparison between the frame synchronization processing and the phase correction processing, the length of time required for the frame synchronization processing is far shorter than that required for the phase correction processing in general. Therefore, the loss of time is not very great if, upon the phase correction processing, the frame synchronization processing is performed supplementally.

In the step S107, if QBER is deteriorated more than $Q_{Eve}$ (S107: No), the controller 211 consecutively repeats the phase correction processing S105 and frame synchronization processing S106 for a predetermined number (N) of times until QBER $<Q_{Eve}$ (S108). If QBER is not improved even after these processing steps are repeated N times (S108: Yes), then, but not till then, the cryptographic key generation flow is stopped (S109). At this time, it is preferable to generate an alarm indicating the possibility of eavesdropping.

Incidentally, QBER is a value probabilistically determined and has a finite deviation. Accordingly, a fault is determined not only in such a manner that the threshold values $Q_{bit}$ and $Q_{phase}$ for comparison with QBER are set and "a fault is acknowledged when QBER exceeds the threshold values," but also needs to be determined in such a manner that "a fault is acknowledged when QBER exceeds the threshold values a plurality of times successively."

Although QBER is deteriorated also when information is leaked due to an act of eavesdropping during quantum key distribution, this deterioration will not be improved by system recovery. Therefore, in the case where the system is not recovered even after the phase correction processing S105 and frame synchronization processing S106 are repeated a predetermined number of times successively, it is determined that there is a possibility of eavesdropping, and the cryptographic key generation is stopped.

Even in this case, it is possible to generate a cryptographic key, by discarding as much information as might be leaked, using the means of estimating the amount of leaked information shown in above-mentioned Lutkenhaus and Williamson. However, secure cryptographic key generation cannot be performed when the error rate exceeds a certain value. Therefore, this value is used as the threshold value $Q_{Eve}$ for eavesdropping detection.

In addition, there are some occasions where the error rate is increased due to a fault of a device itself used in a system. However, since the ultimate object of the present system is to generate a shared cryptographic key without leakage to a third party, the faults that do not affect QBER can be ignored. Therefore, it may be acceptable that the termination of cryptographic key generation is triggered when QBER exceeds the threshold value $Q_{Eve}$ even after system recovery.

FIG. 11B schematically shows change in QBER, as well as the phase correction processing S105 and frame synchronization processing S106, when, as an example, $Q_{bit}$=30%, $Q_{phase}$=10%, and $Q_{Eve}$=10% plus. As shown in FIG. 11B, even when QBER is deteriorated, it is checked whether or not a recovery can be made by carrying out the phase correction processing S105 and frame synchronization processing S106. If the system is recovered, the key generation flow can be continued without termination, which can improve the efficiency in key generation. Moreover, when the system cannot be recovered even after the phase correction processing S105 and frame synchronization processing S106 are repeated several times, it is determined that "there is a possibility of eavesdropping," and cryptographic key generation is stopped. Therefore, security can be ensured as well as the efficiency in key generation.

6.1) Modulation/Detection Phase Deviation

A quantum key distribution system of a round-trip type as shown in FIG. 3 has the advantage that it is possible to suppress disturbances in the polarization direction dependency that occur along a transmission line, such as PMD (Polarization Mode Dispersion) and PDL (Polarization Dependent Loss), and also the advantage that it is possible to efficiently organize an optical interferometer required to read phase information superimposed on a photon pulse.

On the other hand, because of the round-trip type, there arises a need to bidirectionally use phase modulators for superimposing phase information on a photon pulse, which creates a need for high precision in the modulation timing in comparison with the case where a phase modulator is unidirectionally used. Here, if the timing of driving a phase modulator deviates from the timing when a photon pulse is passing through the phase modulator, a phase modulation of a desired amount cannot be performed, resulting in the clarity, which corresponds to the signal-to-noise ratio (SN ratio) of the interferometer, being degraded. This degradation, in other words, corresponds to deterioration in QBER.

As described above, in the sender 10, the optical quartet pulses are phase-modulated by the phase modulator 101 when each optical pulse is passing through the phase modulator 101, and the optical double pulses obtained by the PBS 102 combining the modulated quartet pulses are attenuated to a single-photon state by the variable optical attenuator 103 and then transmitted to the receiver 20. In the receiver 20, one of the optical double pulses in the single-photon state, which has not been phase-modulated at the sender, is phase-modulated by the phase modulator 205, and the optical pulses are made to interfere, whereby a photon is detected by the balanced, gated-mode photon detector APD0 or APD1 (see Tomita. It is generally known that avalanche multiplication is most likely to occur in APD if timing adjustment is made such that a photon enters immediately after the application of gate voltage to APD is started. As the timing of applying gate voltage to APD deviates from the timing of the incidence of a photon, the avalanche multiplication decreases accordingly, with the result that output current also decreases and the SN ratio is deteriorated. This deterioration, in other word, corresponds to deterioration in QBER.

Since such a timing deviation, that is, a deviation of the timing of driving the phase modulator/APD from the timing of the incidence of a photon is caused by the delay variation over an optical transmission line due to change in temperature and/or the delay variation among electric circuits, the degree of deviation is relatively small. Therefore, the timing of the incidence of a photon and the timing of driving the phase modulator/ADP can be adjusted to the optimum position by shifting the clock phase, whereby it is possible to restore QBER to the value before deterioration.

Figure 1:
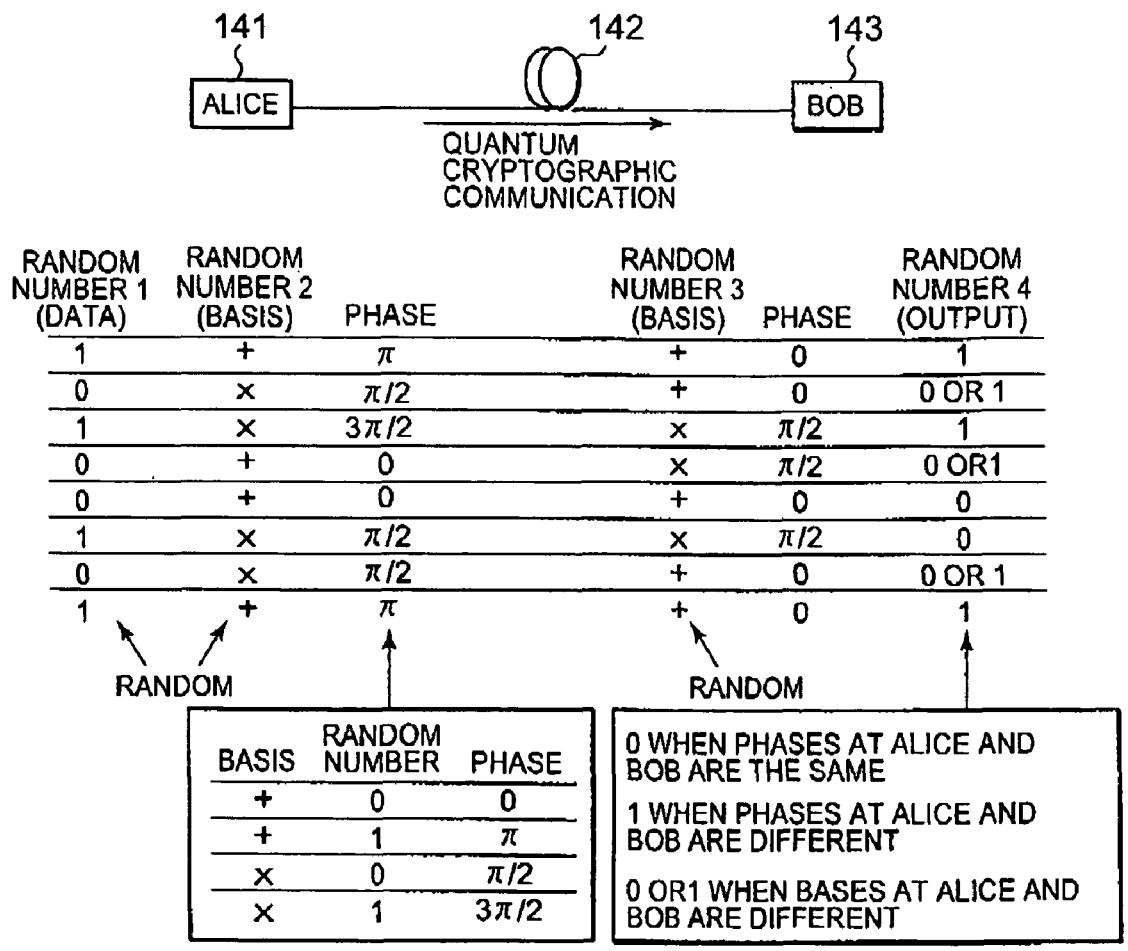
FIG. 1 is a schematic diagram showing a concept of a quantum key distribution method according to the BB84 protocol.
Figure 2:
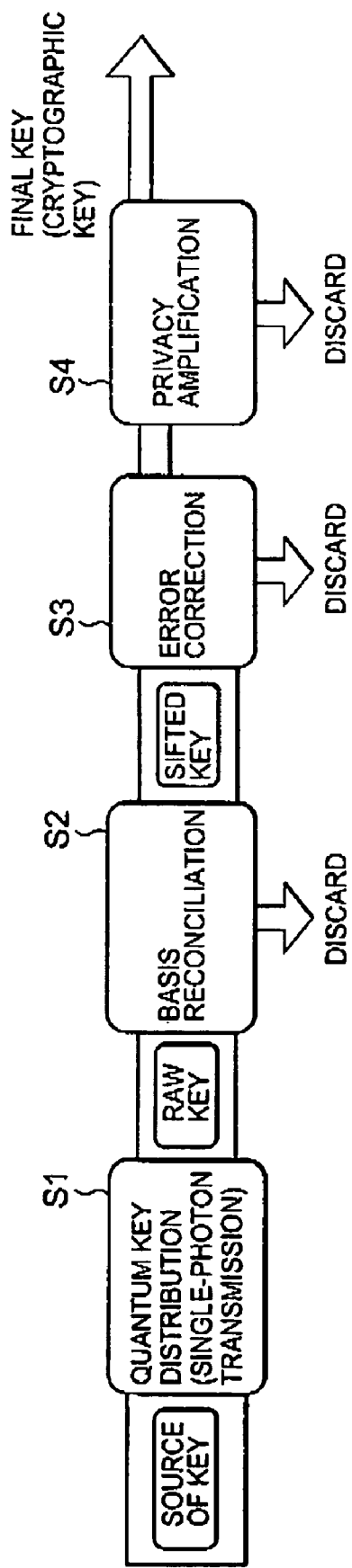
FIG. 2 is a flowchart showing a flow of quantum key generation in general.

Several methods for adjusting the clock phase have been proposed. Maeda describes a method using a temperature-compensating delay lock loop (DLL) that detects a phase difference between a photon detection signal and a corrected clock signal, obtained by variably delaying a clock signal, and, depending on this phase difference, changes the amount of delay made on the clock signal (see FIG. 2 of Maeda). Alternatively, it is also possible to use a method by which the clock phase is sequentially shifted while QBER is monitored, and the clock phase that minimizes QBER is set as the optimum position.

6.2) Presence of Eavesdropper

The amount of information leaked to an eavesdropper, Eve, described in Lutkenhaus and Williamson is based on an eavesdropping scheme by the name of "Incoherent Attack (Individual Attack)." According to this eavesdropping scheme, Eve steals a certain amount of random-number information superimposed on photon pulses by entangling a quantum probe that Eve prepares herself with a single photon only at a time, and maintains the quantum probe until the communication for basis reconciliation is started between Alice and Bob. Eve can obtain the maximum amount of information by performing proper observation after the bases are released.

According to Lutkenhaus and Williamson, when QBER becomes 11% to 15% or larger, the amount of information Eve has obtained exceeds the amount of information Bob has obtained. These QBER threshold values are theoretically derived. With various restrictions existing in the real world taken into account, the amount of information that could be leaked to Eve may be smaller. However, the noise figure of a real device cannot be quantified based on a theory, the above-mentioned QBER threshold value (11% to 15%) is generally used as the threshold value $Q_{Eve}$ for eavesdropping detection.

Apart from the above-mentioned scheme, as a more realistic eavesdropping scheme, there is another scheme such as Intercept/Resend Attack in which Eve receives and observes a photon pulse once and then, based on the result of observation, resends the photon pulse to Bob. However, since the trace of Eve left on a photon bit according to this scheme is more distinct than that of Incoherent Attack, the error rate is more deteriorated when eavesdropping of this scheme is performed. Therefore, if the QBER threshold value $Q_{Eve}$ is set at 10% plus, it is possible to detect eavesdropping of this scheme, in addition to Incoherent Attack.

Further, QBER is a value probabilistically determined and has a finite deviation. Therefore, a fault is determined not only in such a manner that a QBER threshold value is set and "a fault is determined when QBER exceeds this threshold value," but also needs to be determined in such a manner that "a fault is determined when QBER exceeds the threshold value a plurality of times successively." Specifically, it is known that the probability distribution of an event that occurs with a very low probability in a certain size of space during a certain length of time, agrees with the Poisson distribution. Assuming that QBER is 10%, 1000 test bits contains approximately 100 bit errors, and this number (100) of errors has a standard deviation of 10 bits. That is, the number of errors naturally fluctuates in a range of 90 to 110 bits. Therefore, QBER, which is measured based on the number of errors, also varies from 9% to 11%. To reduce this probabilistic difference, it is necessary to increase the number of test bits, or the number of times the test is carried out.

Whatever recovery work is performed, QBER deteriorated by an act of eavesdropping cannot be restored. Therefore, when QBER measured after system recovery exceeds the threshold value $Q_{Eve}$ for eavesdropping detection, it is determined that "there is a possibility of eavesdropping," and the quantum key generation is stopped.

6.3) Light Source/Photo Detector Faults

QBER can also be deteriorated by faults in a laser light source for generating photon pulses and in a photo detector for detecting photon pulses. When the energy conversion efficiency of the laser light source is degraded, the intensity of output light is degraded, which also causes degradation in the intensity of light arriving at the photon detector, resulting in a reduced number of photon counts at the receiver. On the other hand, since the amount of noise in the receiver is constant independently of the intensity of incident light, the SN ratio of a cryptographic key is deteriorated. This deterioration, in other words, corresponds to deterioration in QBER.

Moreover, the photon detector also has various deterioration factors such as degradation in the photoelectric conversion efficiency and reduction in bias voltage. These factors may cause a reduction in the number of photon counts even if light is received at a constant intensity. On the other hand, the amount of noise is also changed with such device deterioration, in which case the SN ratio is generally deteriorated, in most cases. That is, QBER is deteriorated even due to a fault in a photon detector.

QBER deteriorated due to deterioration of a device itself as described above cannot be restored by a recovery mechanism. Therefore, when such a fault is detected, the cryptographic key generation is stopped, with the issue of an alarm.

7. Application Example 2

The present invention is not only applied to the above-described round-trip type, but can be applied to a quantum key distribution system of a one-way type, similarly.

Figure 12:
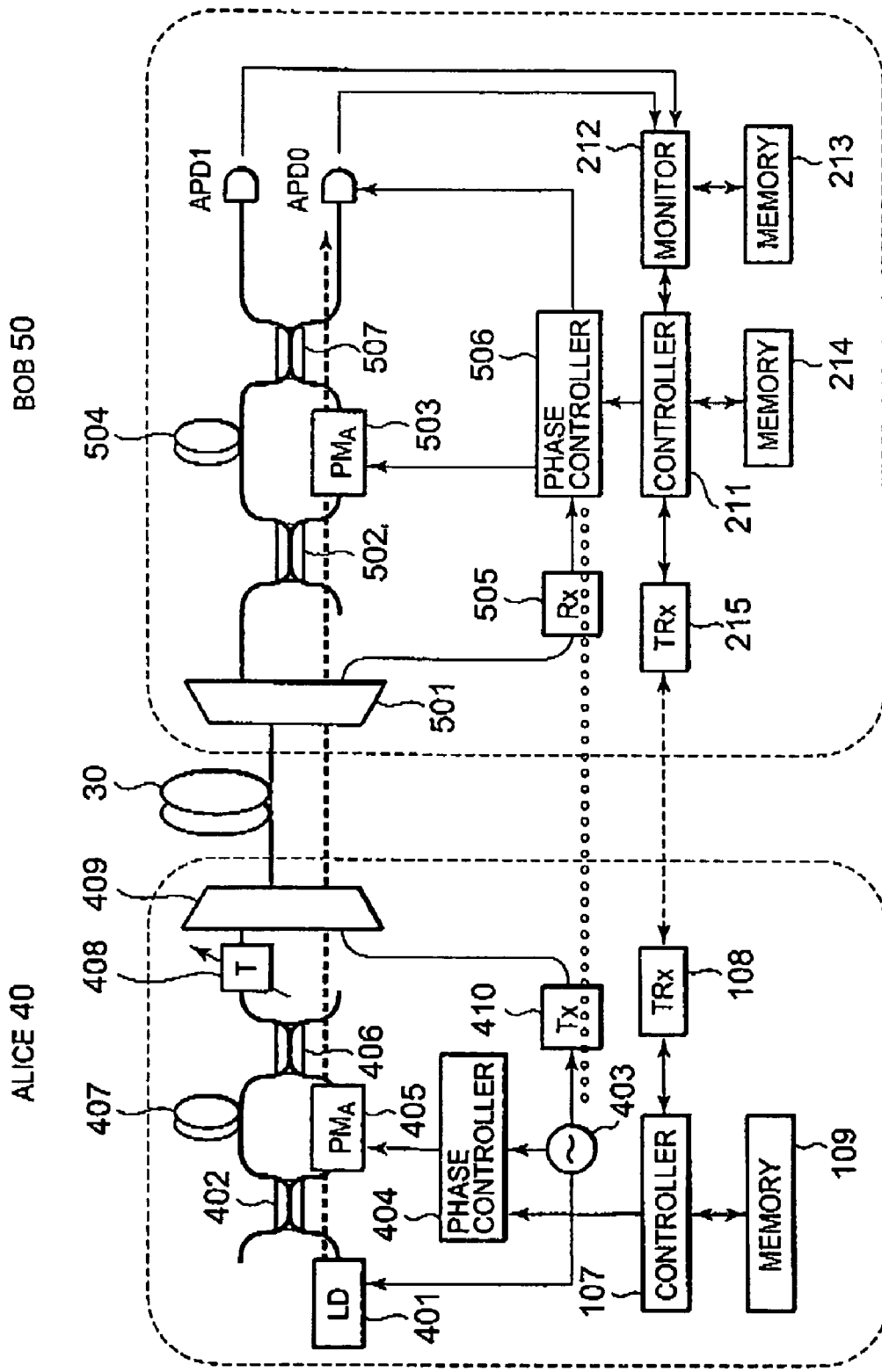
FIG. 12 is a block diagram showing a configuration of a one-way quantum key distribution system to which the frame synchronization control according to the present invention is applied.

FIG. 12 is a block diagram showing a configuration of a one-way quantum key distribution system to which the frame synchronization control according to the present invention is applied. Note that since a monitor, memories and control systems related to the operation of the present invention are similar to those shown in FIG. 3, the same reference symbols and numerals as in FIG. 3 are used for these parts in FIG. 12.

In the one-way quantum key distribution system, a sender (Alice) 40 and a receiver (Bob) 50 are optically connected through the optical fiber transmission line 30, and a laser light source 401 and a clock source 403 are provided to the sender 40.

The laser light source 401 outputs a sequence of optical pulses in accordance with a reference clock supplied from the clock source 403. An optical pulse is split into two at an optical coupler 402. One of the two, an optical pulse Pi, is phase-modulated by a phase modulator 405, which is placed in a short path, and then arrives at an optical coupler 406. The other one, an optical pulse P2, goes along a long path 407 and arrives at the optical coupler 406. Therefore, the phase-modulated optical pulse $P1^{*A}$ and the delayed optical pulse P2 become temporally preceding and following double pulses, which are transmitted to the transmission line 30 after passing through a variable optical attenuator 408 and a wavelength multiplexer/demultiplexer 409.

A phase controller 404 outputs a phase control signal to the phase modulator 405 in accordance with the reference clock from the clock source 403. In accordance with the phase control signal, the phase modulator 405 phase-modulates the passing optical pulse P1. The depth of phase modulation depends on a combination of a random number and a basis stored in the memory 109 as described in the first embodiment. The reference clock from the clock source 403 is transmitted to the transmission line 30 by an optical transmitter 410 after passing through the wavelength multiplexer/demultiplexer 409, as an optical signal at a wavelength different from that of the laser light source 401. Incidentally, as in the first embodiment, the controller 107 in the sender 40 and the controller 211 in the receiver 50 exchange data required for frame synchronization and phase correction, control signals and the like similarly by wavelength multiplexing transmission, via the optical transceivers 108 and 215.

In the receiver 50, the optical pulses $P1^{*A}$ and P2 are input to an optical system similar to that of the sender 40 after passing through a wavelength multiplexer/demultiplexer 501. Specifically, the optical pulses $P1^{*A}$ and P2 are split at an optical coupler 502 and individually go along a long path 504 and go through a phase modulator 503 placed in a short path similarly to that in the sender 40. Then, these pulses are combined at an optical coupler 507. In this case, it is only when the optical pulse $P1^{*A}$ having passed along the short path (phase modulator 405) in the sender 40 and the long path 504 in the receiver 50 and the optical pulse $P2^{*B}$ having passed along the long path 407 in the sender 40 and the short path (phase modulator 503) in the receiver 50 arrive at the optical coupler 507 at the same time and interfere with each other, that any one of the photo detectors APD0 and APD1 can detect the optical pulse depending on the difference between the depths of phase modulation at the sender 40 and the receiver 50.

A phase controller 506 outputs a phase control signal to the phase modulator 503 in accordance with the reference clock received from the sender 40 through an optical receiver 505. In accordance with the phase control signal, the phase modulator 503 phase-modulates the passing optical signal. The depth of phase modulation depends on a basis stored in a memory 214 as described already.

Data thus detected by the photo detectors APD0 and APD1 are written in the memory 213 through the monitor 212. The monitoring and control by the monitor 212 and controller 211 is carried out as described in the foregoing embodiments.

The present invention can be utilized for highly confidential communication using shared cryptographic key distribution technologies, typified by quantum key distribution technologies. For a quantum key distribution method, any of the one-way type and the round-trip type may be employed.

The invention claimed is:

1. A method for establishing bit-to-bit correspondence of data to be shared between a first communication device and a second communication device, which are connected through a plurality of communication channels, comprising:
 a) at the first communication device, transmitting first data to the second communication device through a first communication channel, wherein the first data comprises a plurality of bits each positioned at sequential bit timings;
 b) at the second communication device, modulating the transmitted first data which has been received from the first communication device through the first communication channel, using second data;
 c) storing the modulated first data as third data;
 d) provisionally setting a first sync deviation and a second sync deviation, wherein the first sync deviation is a bit-timing difference between the first and second communication devices, and the second sync deviation is a bit-timing difference between the second data and the third data within the second communication device;
 e) extracting a part of the third data which corresponds to the second data and is determined depending on the second sync deviation;
 f) comparing a part of the third data to a corresponding part of the first data which is determined depending on the first and second sync deviations while sequentially changing the first sync deviation and the second sync deviation within a predetermined adjustment range so that a plurality of possible combinations of the first sync deviation and the second sync deviation are tried; and
 g) determining the first and second sync deviations which make a maximum rate of data matching between a part of the third data and the corresponding part of the first data.

2. The method according to claim 1, wherein the f) comprises:
 f.1) determining bit timings of the first data each corresponding to bit timings of a part of the third data based on provisional first and second sync deviations;
 f.2) comparing each bit value of the part of the third data to a corresponding bit value of the first data;
 f.3) changing at least one of the provisional first and second sync deviations by a predetermined step; and
 f.4) repeating the f.1) to the f.3) within the predetermined adjustment range.

3. The method according to claim 1, wherein in the g) the provisional first and second sync deviations providing a best one of comparison results of the d) are determined as the established bit-to-bit correspondence.

4. The method according to claim 1, wherein the f) comprises:
 f.1) determining bit timings of the first data each corresponding to bit timings of a part of the third data based on provisional first and second sync deviations;
 f.2) comparing each bit value of the part of the third data to a corresponding bit value of the first data;
 f.3) when a comparison result of the f.2) is not better than a predetermined threshold, changing at least one of the provisional first and second sync deviations by a predetermined step; and
 f.4) repeating the f.1) to the f.3) within the predetermined adjustment range,
 wherein in the g), when the comparison result of the 2) is better than the predetermined threshold, the provisional first and second sync deviations providing such a comparison result are determined as the established bit-to-bit correspondence.

5. The method according to claim 4, wherein, when the comparison result of the f.2) has not been better than the predetermined threshold within the predetermined adjustment range, the method is terminated.

6. The method according to claim 1, wherein the f) and g) comprise:
 h.1) determining bit timings of the first data each corresponding to bit timings of a part of the third data based on provisional first and second sync deviations;
 h.2) comparing each bit value of the part of the third data to a corresponding bit value of the first data;
 h.3) when a comparison result of the h.2) is not better than a first threshold, changing the provisional first sync deviation by a predetermined step;
 h.4) repeating the h.1) to the h.3) within a predetermined adjustment range of the first sync deviation;
 h.5) when the comparison result of the h.2) is better than the first threshold, the provisional first sync deviation providing such a comparison result is determined as the established first sync deviation;
 h.6) when a comparison result of the h.2) is better than the first threshold and is not better than a second threshold, changing the provisional second sync deviation by a predetermined step;
 h.7) comparing each bit value of the part of the third data to a corresponding bit value of the first data;
 h.8) when the comparison result of the h.7) is not better than the second threshold, repeating the h.6) to the h.7) within a predetermined adjustment range of the second sync deviation; and
 h.9) when the comparison result of the h.7) is better than the second threshold, the provisional second sync deviation providing such a comparison result is determined as the established second sync deviation.

7. The method according to claim 6, wherein, when the comparison result of the h.2) has not been better than the first threshold within the predetermined adjustment range of the first sync deviation or when the comparison result of the h.7) has not been better than the second threshold within the predetermined adjustment range of the second sync deviation, the method is terminated.

8. A method for establishing bit-to-bit correspondence of data to be shared between a first communication device and a second communication device, which are connected through a plurality of communication channels, comprising:
 at the first communication device,
  a) transmitting first data to the second communication device through a first communication channel, wherein the first data comprises a plurality of bits each positioned at sequential bit timings;
  b) provisionally setting a first sync deviation which is a bit-timing difference between the first and second communication devices; at the second communication device,
  c) modulating the transmitted first data which has been received from the first communication device through the first communication channel, using second data;
  d) storing the modulated first data as third data;

e) provisionally setting a second sync deviation which is a bit-timing difference between the second data and the third data within the second communication device;

f) transmitting a part of the third data when the provisional second sync deviation has been changed within a predetermined adjustment range; at the first communication device, g) extracting a part of the third data which corresponds to the second data and is determined depending on the second sync deviation;

h) comparing the part of the third data received from the second communication device to a corresponding part of the first data which is determined depending on the first and second sync deviations while sequentially changing the provisional first sync deviation within a predetermined adjustment range so that a plurality of possible combinations of the first sync deviation and the second sync deviation are tried; and i) determining the first and second sync deviations which make a maximum rate of data matching between a part of the third data and the corresponding part of the first data.

9. A system for establishing bit-to-bit correspondence of data to be shared between a first communication device and a second communication device, which are connected through a plurality of communication channels, wherein
the second communication device comprises:
a receiving section for receiving first data transmitted by the first communication device through a first communication channel, wherein the first data comprises a plurality of bits each positioned at sequential bit timings;
a phase modulator for modulating the first data transmitted by the first communication device through the first communication channel, using second data;
a memory for storing the modulated first data as third data;
a data generation section for provisionally setting a second sync deviation which is a bit-timing difference between the second data and the third data within the second communication device and generating a part of the second data when the provisional second sync deviation has been changed within a predetermined adjustment range;
a transmitting section for transmitting the part of the third data to the first communication device through a second communication channel, and
the first communication device comprises a controller performing:
provisionally setting a first sync deviation which is a bit-timing difference between the first and second communication devices;
extracting a part of the third data which corresponds to the second data and is determined depending on the second sync deviation;
comparing the part of the third data received from the second communication device to a corresponding part of the first data which is determined depending on the first and second sync deviations while sequentially changing the provisional first sync deviation within a predetermined adjustment range so that a plurality of possible combinations of the first sync deviation and the second sync deviation are tried; and determining the first and second sync deviations which make a maximum rate of data matching between a part of the third data and the corresponding part of the first data.

10. A system comprising a transmitter and a receiver, which are connected by an optical transmission line and communicate with each other through a plurality of communication channels, wherein
the transmitter comprises:
a first memory for storing first data and third data, wherein the first data comprises a plurality of bits each positioned at sequential bit timings;
a first modulator for modulating an optical signal according to the first and third data;
a first communication section for transmitting an optical signal, modulated by the first modulator, to the receiver through a first communication channel; and
a first transceiver for data communication with the receiver through a second communication channel, and
the receiver comprises:
a second memory for storing second data;
a second communication section for receiving the optical signal, modulated by the first modulator, from the transmitter through the first communication channel;
a second modulator for modulating the optical signal modulated by the first modulator according to the second data;
a photo detector for detecting fourth data based on an optical output signal of the second modulator;
a third memory for storing the fourth data;
a second transceiver for data communication with the transmitter through the second communication channel; and
a receiver-side controller performing: provisionally setting a first sync deviation which is a bit-timing difference between the second data and the fourth data; and transmitting a part of the second and fourth data when the provisional first sync deviation has been changed within a predetermined adjustment range,
wherein the transmitter further comprises:
a transmitter-side controller performing: provisionally setting a second sync deviation which is a bit-timing difference between the first data and the fourth data; extracting a part of the third data which corresponds to the second data and is determined depending on the second sync deviation, comparing the part of the second and fourth data to a corresponding part of the first and third data which is determined depending on the first and second sync deviations while sequentially changing the provisional second sync deviation within a predetermined adjustment range so that a plurality of possible combinations of the first sync deviation and the second sync deviation are tried; and determining the first and second sync deviations which make a maximum rate of data matching between a part of the third data and the corresponding part of the first data.

11. A transmitter in the system according to claim 10.

12. A receiver in the system according to claim 10.

13. A non-transitory computer-readable medium storing thereon a program instructing a computer to establish bit-to-bit correspondence of data to be shared between a first communication device and a second communication device, which are connected through a plurality of communication channels, the program comprising the steps of:
modulating first data, received at the second communication device from the first communication device, using second data, wherein the first data comprises a plurality of bits each positioned at sequential bit timings;

storing the modulated first data as third data;

provisionally setting a first sync deviation and a second sync deviation, wherein the first sync deviation is a bit-timing difference between the first and second communication devices, and the second sync deviation is a bit-timing difference between the second data and the third data within the second communication device;

extracting a part of the third data which corresponds to the second data and is determined depending on the second sync deviation;

comparing a part of the third data to a corresponding part of the first data which is determined depending on the first and second sync deviations while sequentially changing the first sync deviation and the second sync deviation within a predetermined adjustment range so that a plurality of possible combinations of the first sync deviation and the second sync deviation are tried; and determining the first and second sync deviations which make a maximum rate of data matching between a part of the third data and the corresponding part of the first data.

* * * * *